INVENTORS
DAVID C. COLL
JOHN R. STOREY
DONALD A. GEORGE

A-D STORE AND SELECTION GATES

July 21, 1970  D. C. COLL ET AL  3,521,037
APPARATUS AND METHOD OF RECEIVING DISTURBED SIGNALS
Filed Jan. 20, 1966  44 Sheets-Sheet 6
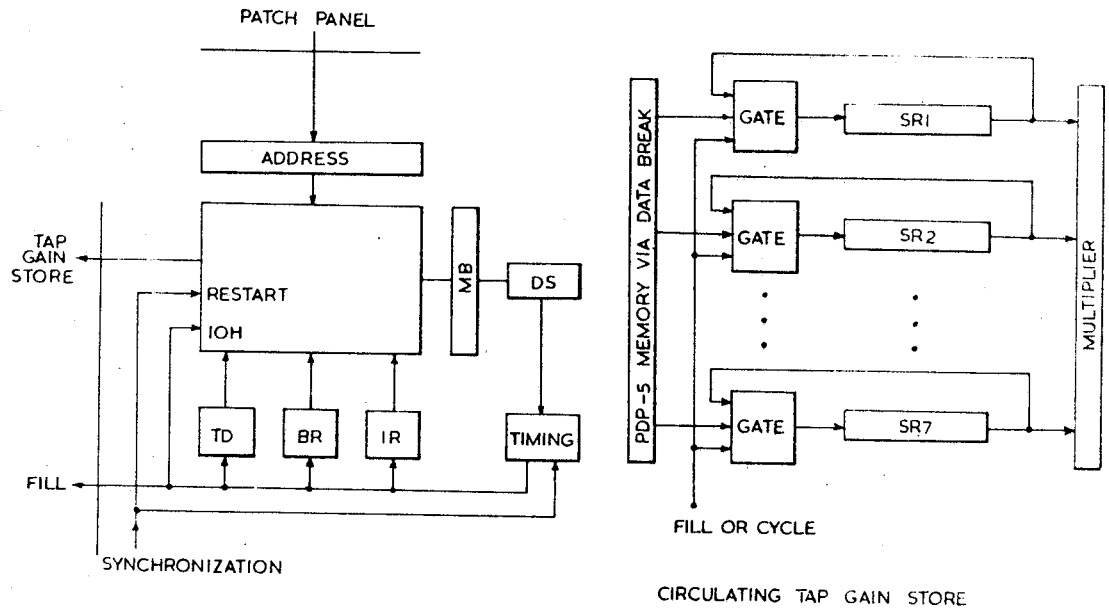
COMPUTER INTERFACE
WITH TAP GAIN STORE
CIRCULATING TAP GAIN STORE
FIG. 9
FIG. 11
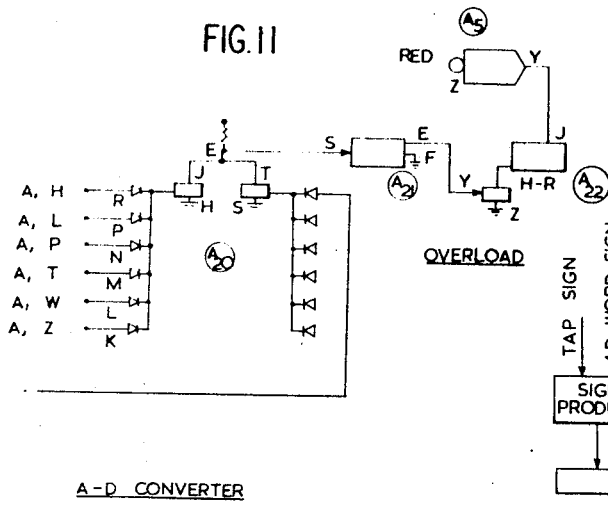
A-D CONVERTER
FIG. 12d
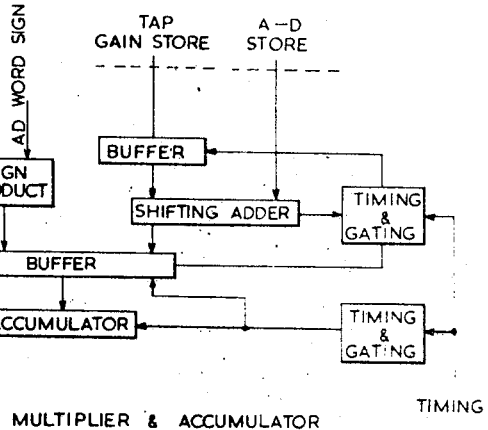
MULTIPLIER & ACCUMULATOR
FIG. 10
INVENTORS
DAVID C. COLL
JOHN R. STOREY
DONALD A. GEORGE
BY
Stevens, Davis, Miller & Mosher
ATTORNEYS

DATA IN SIGN + MAGNITUDE
FROM OUTPUTS OF A-D CONVERTERS

July 21, 1970

D. C. COLL ET AL 3,521,037

APPARATUS AND METHOD OF RECEIVING DISTURBED SIGNALS

Filed Jan. 20, 1966

INVENTORS
DAVID C. COLL
JOHN R. STOREY
DONALD A. GEORGE

BY

*Stevens, Davis, Miller & Mosher*

ATTORNEYS

July 21, 1970　　　　D. C. COLL ET AL　　　3,521,037
APPARATUS AND METHOD OF RECEIVING DISTURBED SIGNALS
Filed Jan. 20, 1966　　　　　　　　　　44 Sheets-Sheet 40

INVENTORS
DAVID C. COLL
JOHN R. STOREY
DONALD A. GEORGE
BY

ATTORNEYS

July 21, 1970     D. C. COLL ET AL     3,521,037

APPARATUS AND METHOD OF RECEIVING DISTURBED SIGNALS

Filed Jan. 20, 1966     44 Sheets-Sheet 41

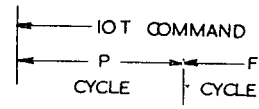

PDP5   6μSEC CYCLE TIMES

HALT PULSE
SHIFT A-D INTO STORE, READ ACCUMULATOR AND MAKE BREAK REQUEST AT IOT1
         BREAK REQUEST AND TRANSFER DIRECTION

CLEAR ACCUMULATOR AND GATE COUNTER TO ZERO   START A-D

A-D CONVERSION COMPLETE WITHIN 16μ SECS

ADDRESS ACCEPTED PULSES

INCREMENT REQUEST (FIRST TRANSFER ADDRESS WIRED DIRECT TO MEMORY

GATE COUNTER OUTPUT

PULSES TO GATE COUNTER

CLEAR 7 M.S. BITS, SET 6 L.S. BITS OF MULTIPLIER, SET STORED DATA INTO MULTIPLICAND

DATA SET INTO MULTIPLICAND

1/2 ADD MULTIPLIER

CARRY MULTIPLIER

SHIFT MULTIPLIER

CLEAR 14 STAGE INCIDENT REGISTER OF ACCUMULATOR

READ INTO 14 STAGE INCIDENT REGISTER

1/2 ADD TO ACCUMULATOR

CARRY TO ACCUMULATOR
    CARRY PROPAGATE TO ACCUMULATOR

FIG. 17e

INVENTORS
DAVID C. COLL
JOHN R. STOREY
DONALD A. GEORGE
BY
*Stevens, Davis, Miller & Mosher*
ATTORNEYS

3,521,037
APPARATUS AND METHOD OF RECEIVING DISTURBED SIGNALS

David C. Coll, 1138 Sherman Drive, Ottawa, Ontario, Canada; John R. Storey, R.R. 2, Carp, Ontario, Canada; and Donald A. George, 88 Beaver Ridge, Parkwood Hills, Ottawa, Ontario, Canada
Filed Jan. 20, 1966, Ser. No. 521,907
Int. Cl. H04b 1/62
U.S. Cl. 235—150                                6 Claims

ABSTRACT OF THE DISCLOSURE

A communication receiver for receiving an information signal and removing the noise and intersymbol interference components therefrom by utilizing a matched filter adapted to minimize substantially all the additive noise from said input signal and having an impulse response which is substantially the time inverse of a particular input signal and sampled data apparatus electrically connected to the output of said matched filter, said sampled data means having an impulse response given by:

$$f(t) = \sum_{i=-M}^{N} A_i \cdot \delta(t-(i+M)T)$$

Figures 1, 2:
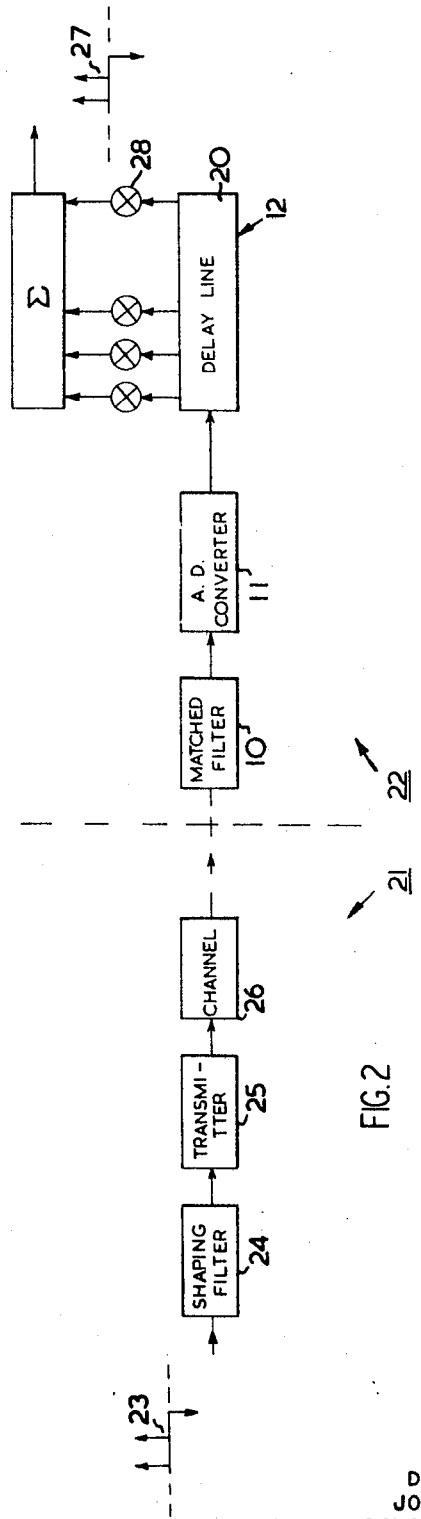

where:

$\delta(t)$ is the unit impulse function and
T is the separation between transmitted symbols, i.e., it is the inverse of the signalling rate;
M and N are parameters determining the size of the sampled-data means;
MT is the delay required to make $f(t)$ realizable; and
$A_i$ represents various tap grains.

---

This invention relates to apparatus and method for receiving disturbed signals. The signals may be disturbed, for example, by intersymbol interference or by additive noise and intersymbol interference.

In the past, conventional matched filters have been used to provide usable communications in the presence of additive noise. However, a matched filter does not take intersymbol interference into account and therefore imposes a limitation on the signalling rate on the communication system since the symbols must be spaced sufficiently far apart to prevent intersymbol interference from occurring.

Intersymbol interference in an information signal is not, by itself, a fundamental limitation to the rate at which communications may take place over any given channel, and has been overcome in the past by several means. For example, comparatively complex receivers have ben built to unscramble overlapped signals in the absence of noise. Attempts have also been made to neutralize the effect of intersymbol interference by using an equalizer. Many equalizer deisgns have been utilized over the years but usually in the case of noiseless signals. However, in practice additive noise is usually present as well as intersymbol interference, giving rise to two types of disturbances to the signal symbols.

The term of art, "minimize," as used in the present specification, will be understood to mean "to reduce the effect of at least one disturbance to a minimum, advantageously zero, whereby a usable signal may be obtained."

From one aspect it is an object of the present invention to provide an apparatus which may be used to minimize two types of disturbance to information signals.

According to this aspect there is provided apparatus for receiving an information signal disturbed by additive noise and intersymbol interference including first means for feeding said input information signal to second means adapted to minimize the effect of the additive noise in relation to said input information signal and third means connected to the output of the second means and adapted to minimize said intersymbol interference to thereby provide an output information signal corresponding to the input information signal with minimum additive noise and intersymbol interference.

More specifically according to the present invention there is provided apparatus for receiving an input information signal disturbed by additive noise and intersymbol interference including means for feeding said input information signal to a matched filter adapted to minimize the additive noise from said input information signal and sampled data means electrically connected to the output of the matched filter and adapted to minimize said intersymbol interference to provide an output information signal corresponding to the input information signal with minimum additive noise and intersymbol interference.

More particularly there is also provided according to the present invention apparatus for receiving an input information signal in a disturbed form and providing a corresponding output information signal in a substantially minimized disturbed form comprsing a matched filter for minimizing a first part of the disturbance to said information signal, and sampled data means for minimizing a second part of the disturbance to said information signal to thereby provide said corresponding output information signal.

From another aspect of the present invention it is an object to provide a method which may be used to minimize two types of disturbance to information signals.

According to this aspect there is provided a method for receiving an input information signal disturbed by additive noise and intersymbol interference and providing a corresponding output information signal in a substantially minimized disturbed form comprising the steps of feeding said input information signal to a first means for removing substantially all the additive noise from said input information signal, and feeding the output signal from said matched filter to a second means for minimizing said intersymbol interference from said output signal to thereby provide an output information signal with minimum additive noise and intersymbol interference.

According to this aspect there is also provided a method of receiving an input information signal in a disturbed form and providing a corresponding output information signal in a substantially minimized disturbed form comprising the steps of feeding said input information signal to a sampled data means having a plurality of tap connections, connecting a separate amplifier to each tap connection, connecting the output of each amplifier to a summing integrator whose output constitutes the output of the sampled data means, selecting the gain of said amplifiers to thereby at least partially determine the impulse response of the sampled data means which is given by the formula $$f(t) = \sum_{i=-M}^{N} A_i \delta[t-(i+M)T]$$

where $\delta(t)$ is the unit impulse function and T is the separation between transmitted symbols, i.e., it is the inverse of the signalling rate. M and N are parameters determining the size of the sampled data means, and MT is the delay required to make $f(t)$ realizable.

It is also an object, from a further aspect of the invention, to provide novel and improved apparatus which may be used to minimize one type of disturbance, for example, intersymbol interference.

This invention also provides apparatus for receiving an input information signal in a disturbed form and providing a corresponding output information signal in a substantially minimized disturbed form comprsing sampled data means including a plurality of tap connections, a separate amplifier connected to each tap connection, the output of each amplifier being connected to a summing integrator whose output constitutes the output of the sampled data means of said amplifiers at least partially determining the impulse response of the sampled data means, said sampled data means having an impulse response given by $$f(t) = \sum_{i=-M}^{N} A_i \delta(t-(i+M)T) \quad (1)$$

where:

$\delta(t)$ is the unit impulse function and
T is the separation between transmitted symbols, i.e., it is the inverse of the signalling rate,
M and N are parameters determining the size of the sampled-data means,
and MT is the delay required to make $f(t)$ realizable.

The various tap gain $A_i$ are determined by the set of simultaneous linear equations:

$$\sum_{j=-M}^{N} A_j \{ N_0 C(i-j) + \sum_{n=-\infty}^{\infty} C(i-n)C(j-n) \} = C(i) \quad (2)$$

where $N_0$ is the power spectral density of the additive noise and $$C(i-j) = \int_{-\infty}^{\infty} S(\tau - iT) S(\tau - jT) d\tau \quad (3)$$

is the autocorrelation of S(t), the signal received when a single, isolated, symbol is transmitted also, $$C(i) = \int_{-\infty}^{\infty} S(\tau - iT) S(\tau) d\tau \quad (4)$$

Figure 3:
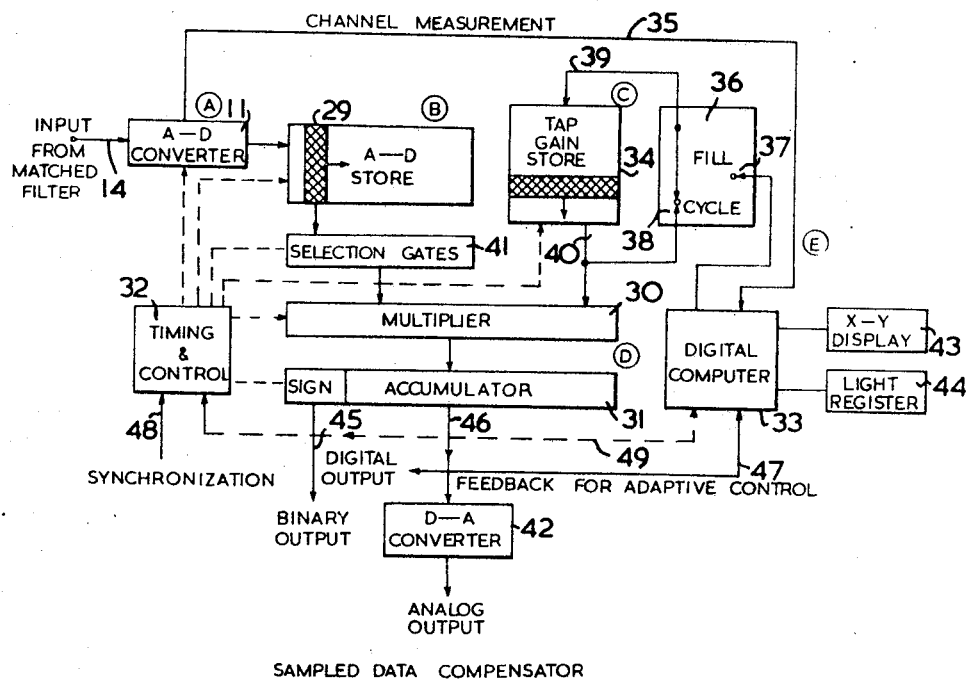
Figure 4:
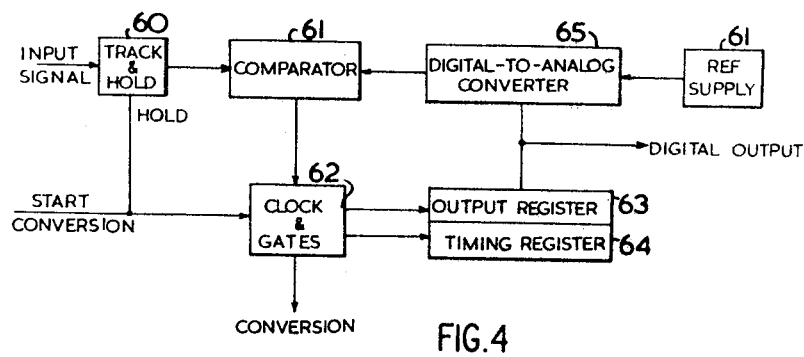
Figure 5:
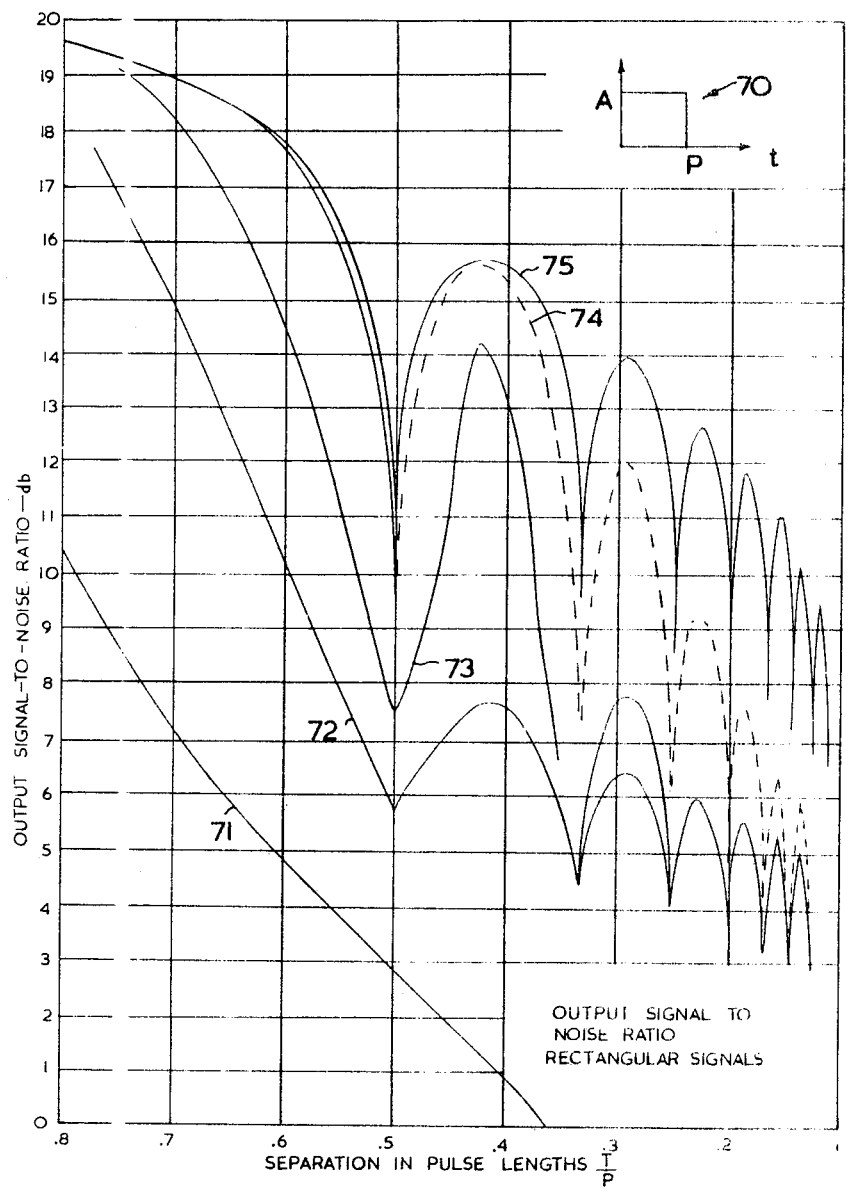
Figure 6:
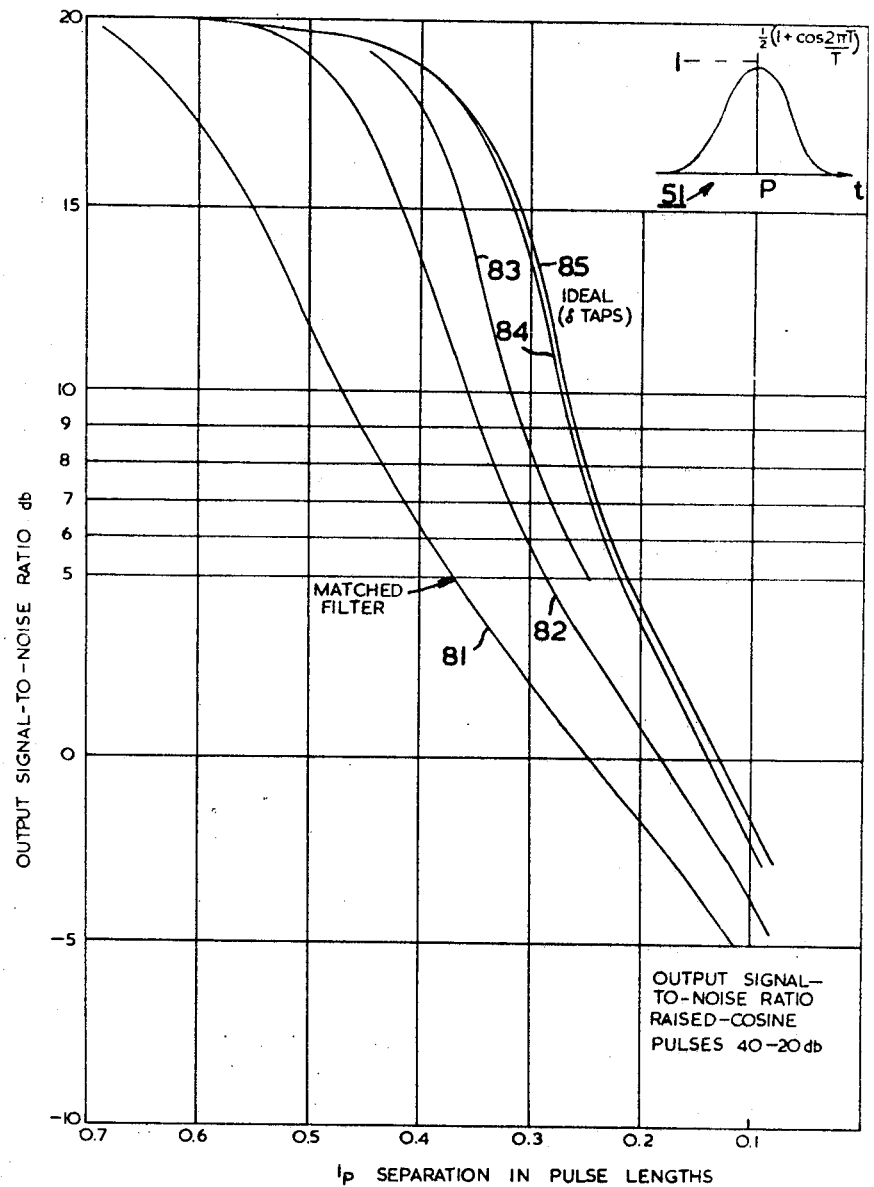
Figure 7:
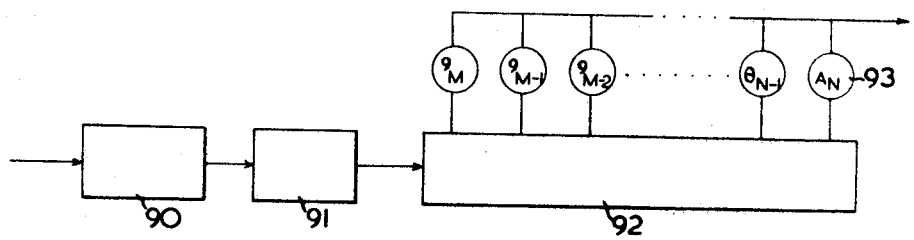
Figure 8:
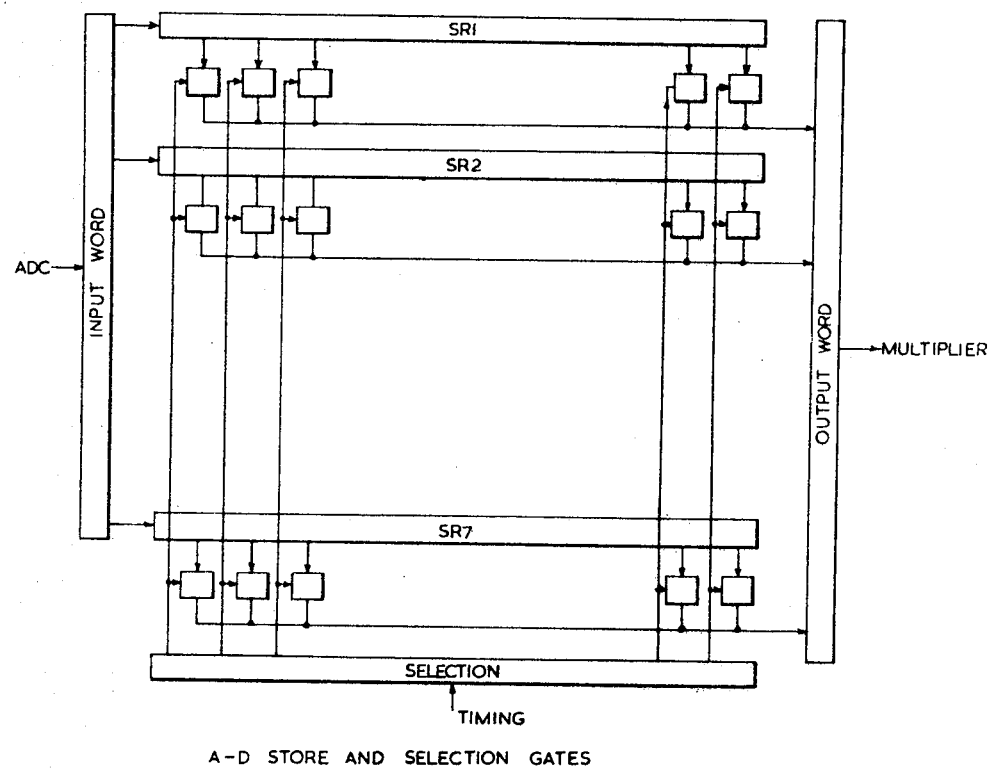
Figure 12A:
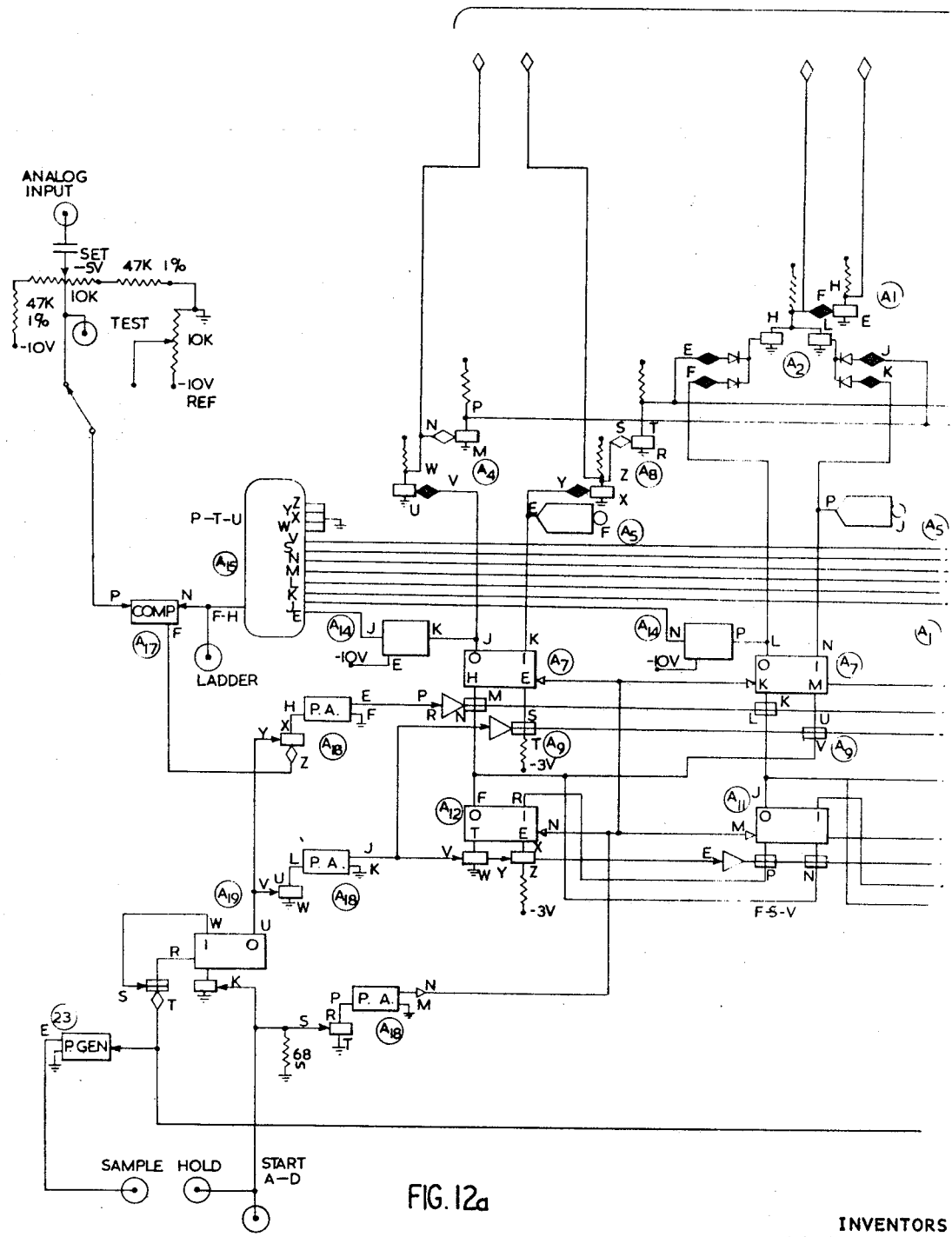
Figure 12B:
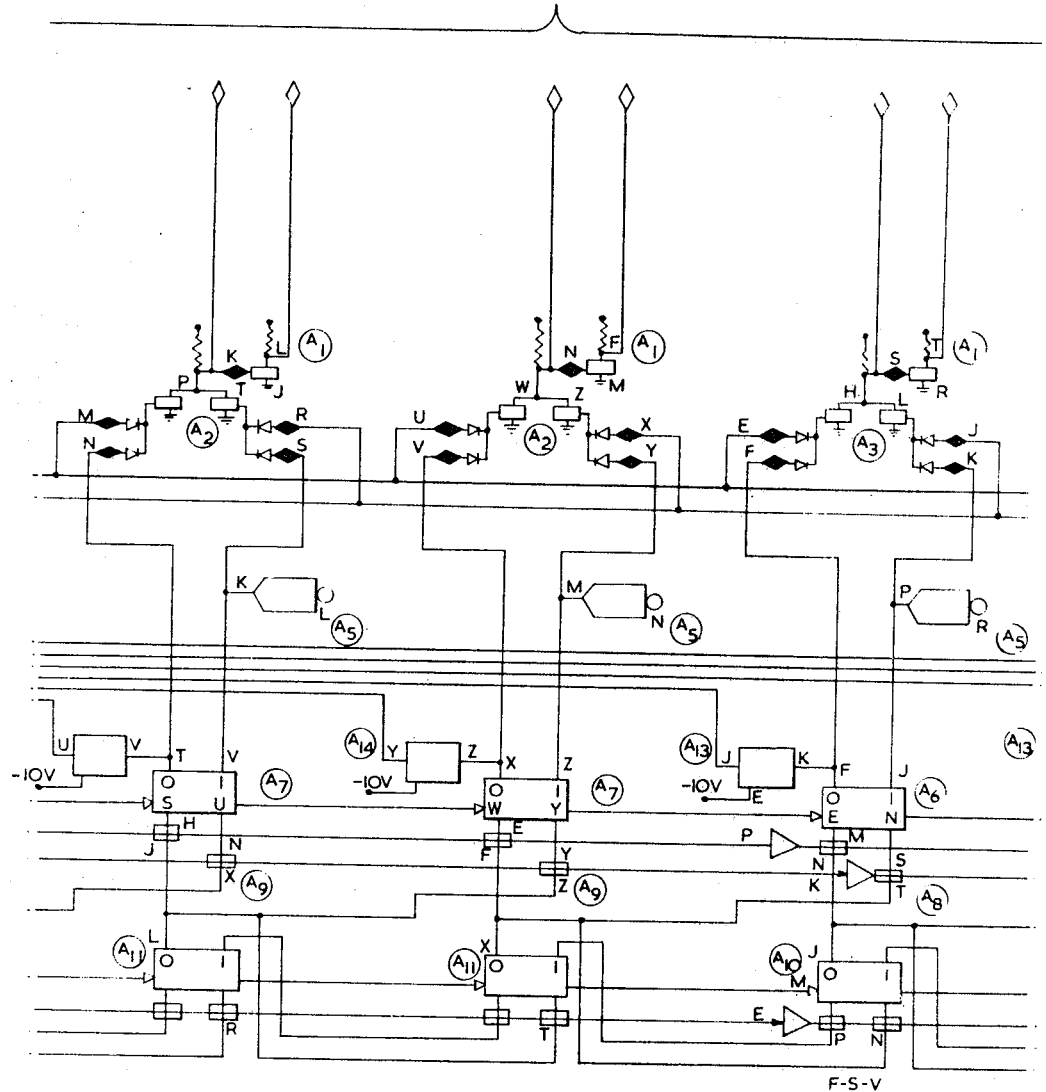
Figure 12C:
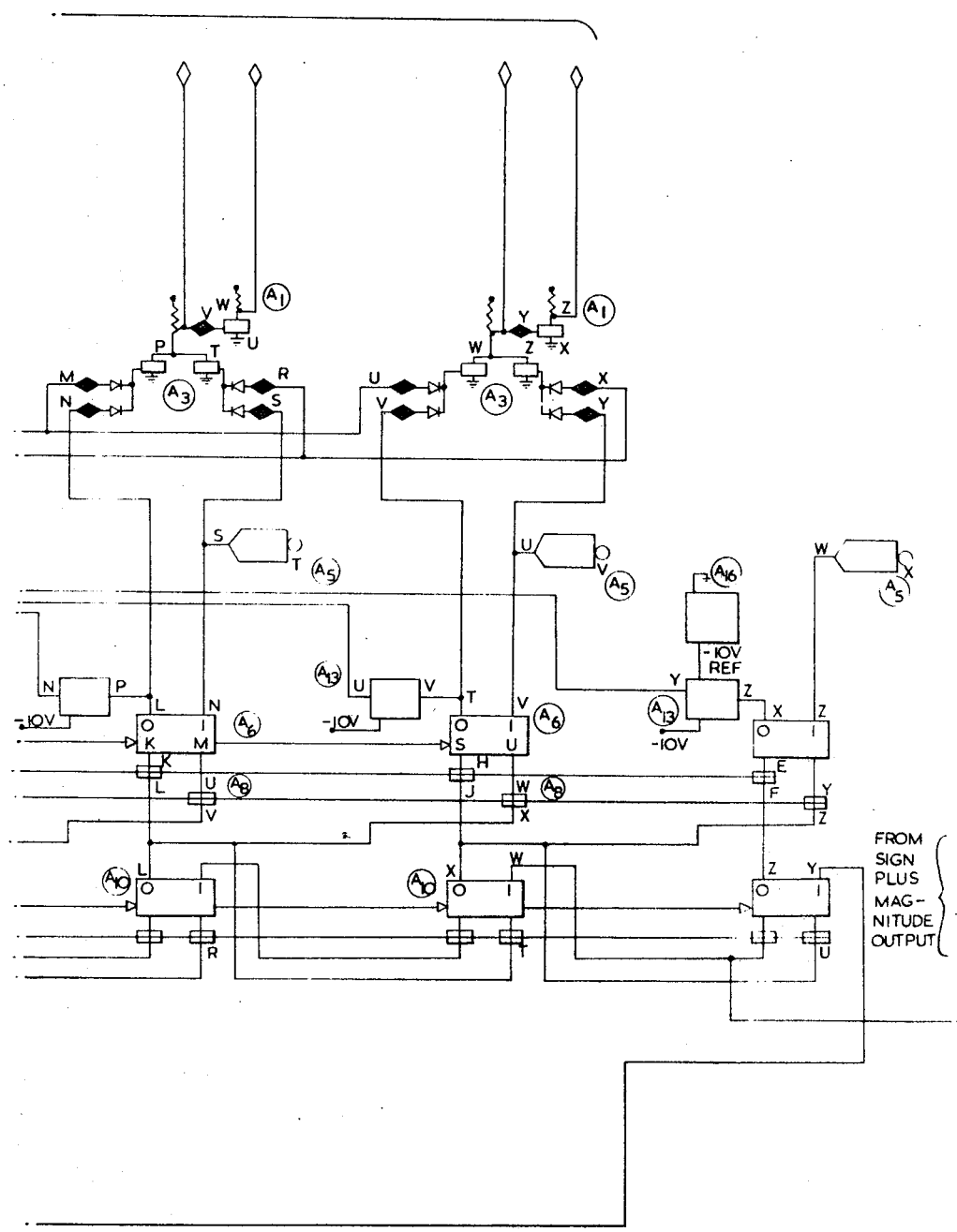
Figure 13A:
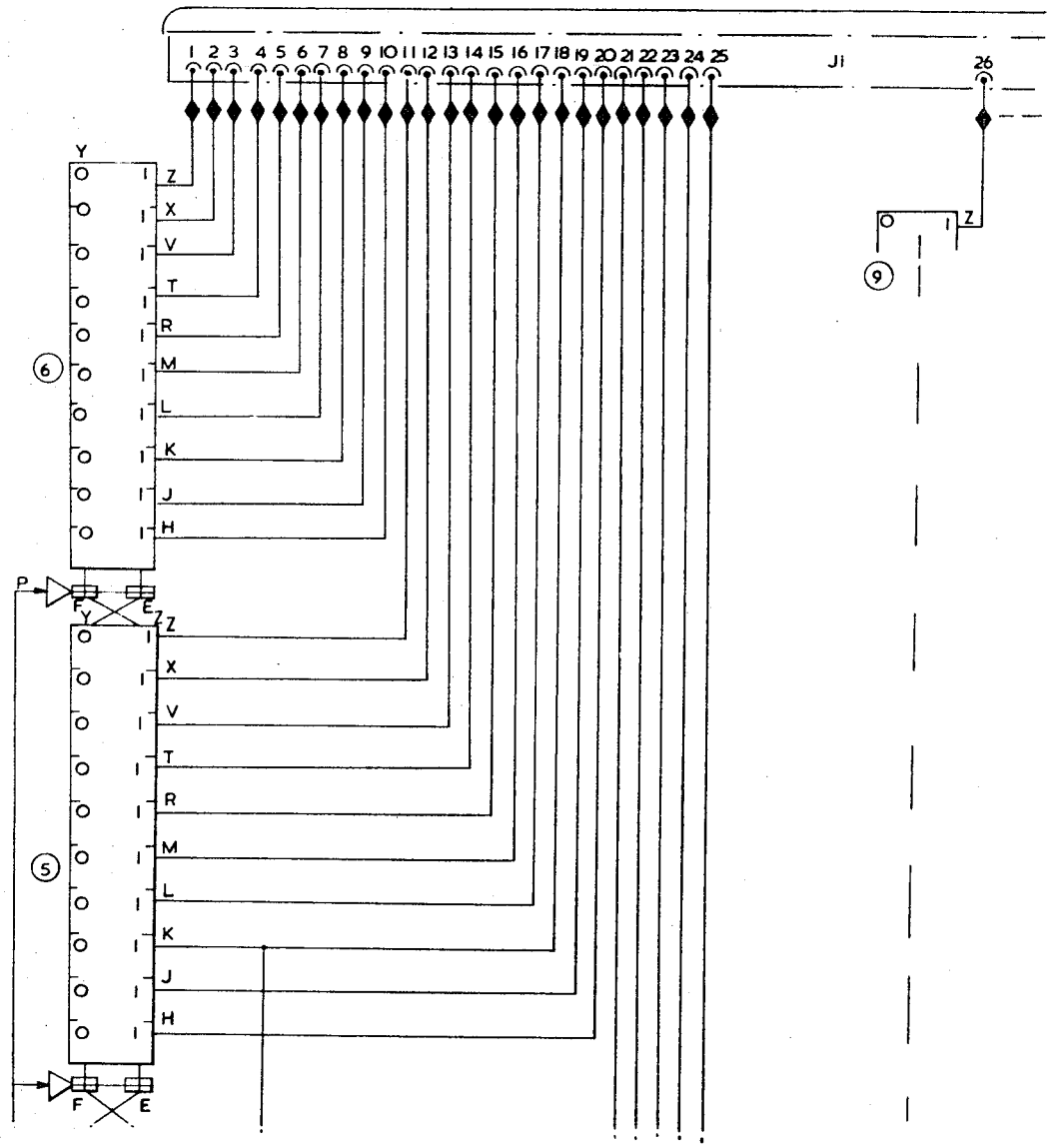
Figure 13B:
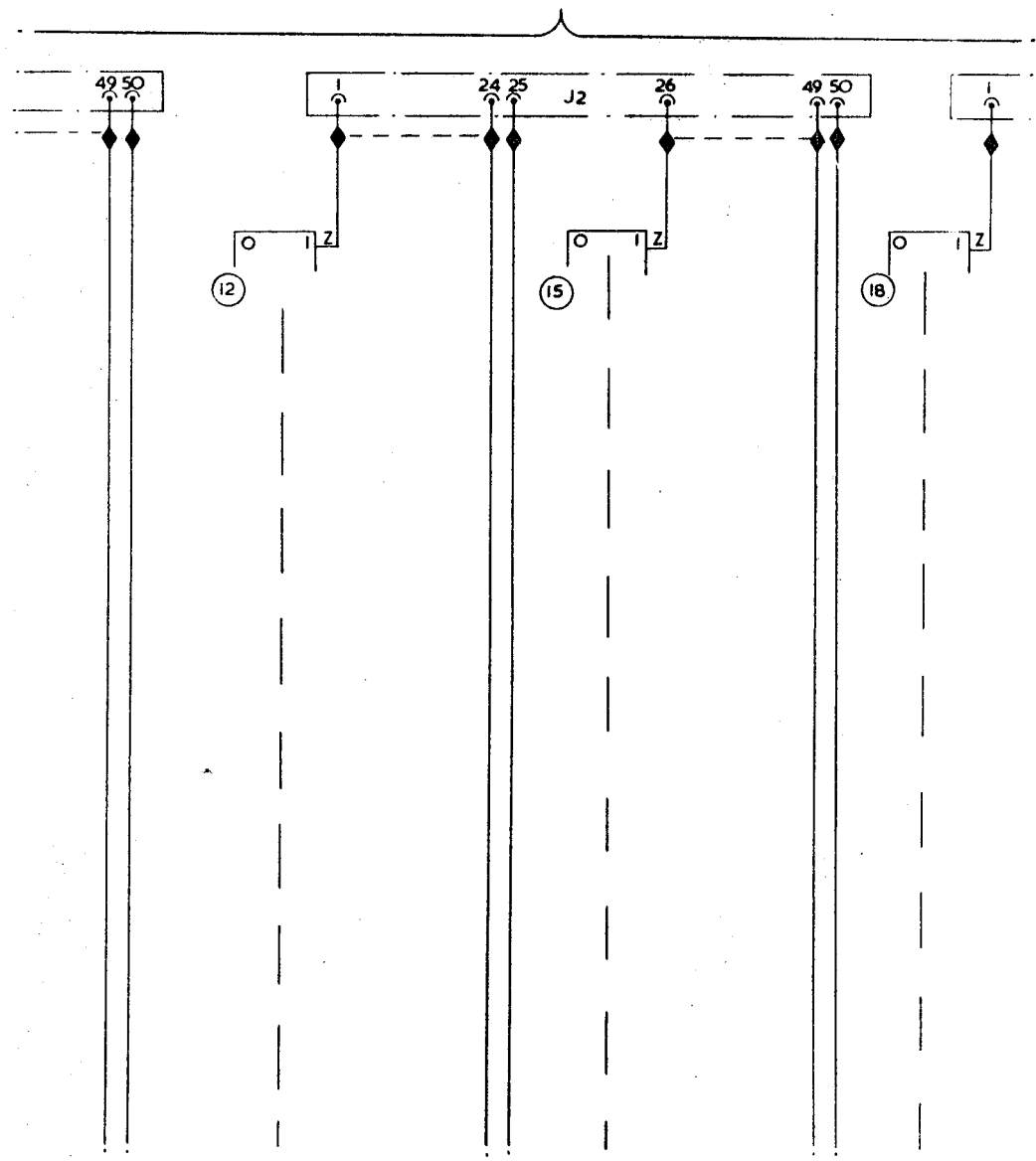
Figure 13C:
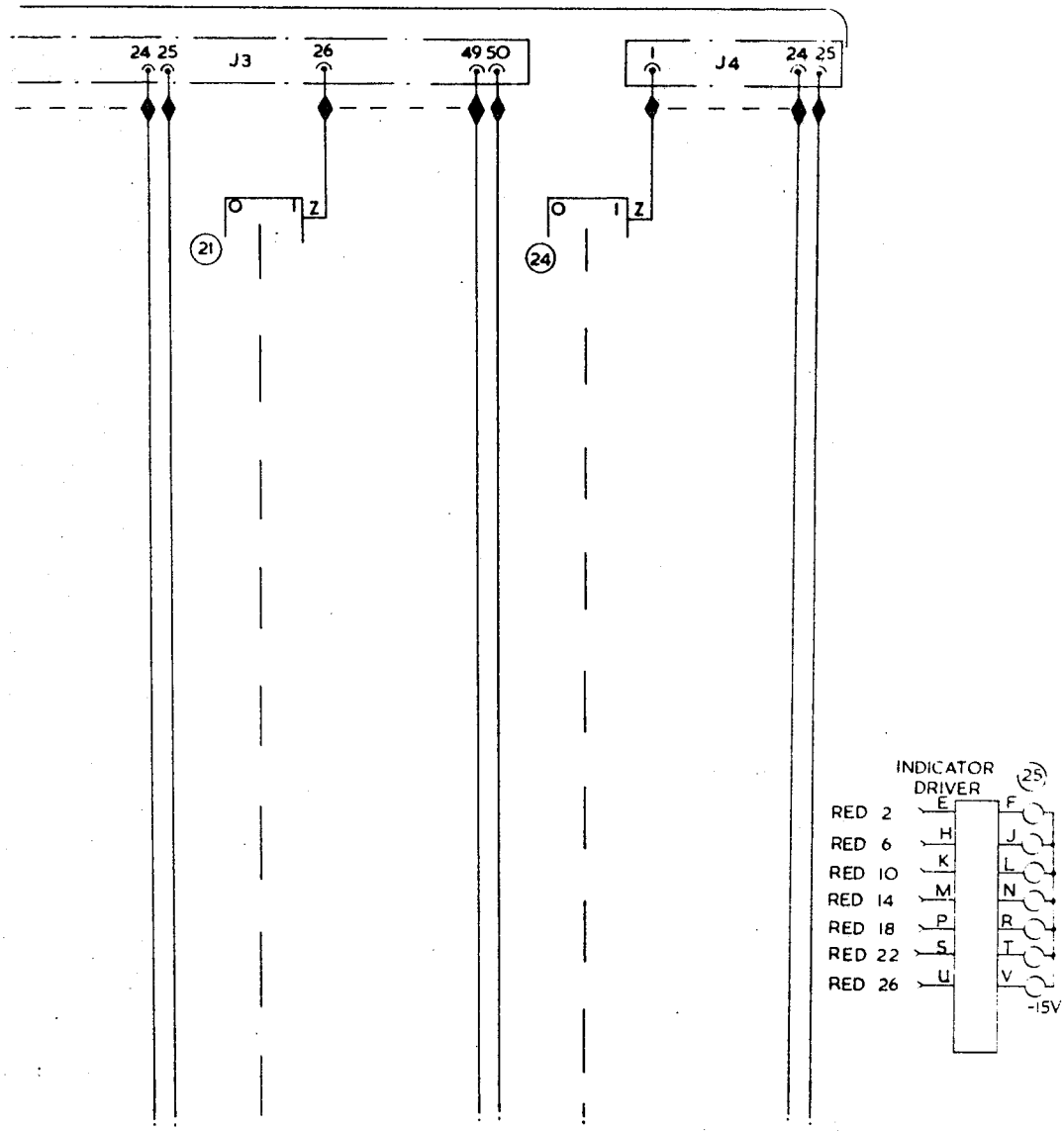
Figure 13D:
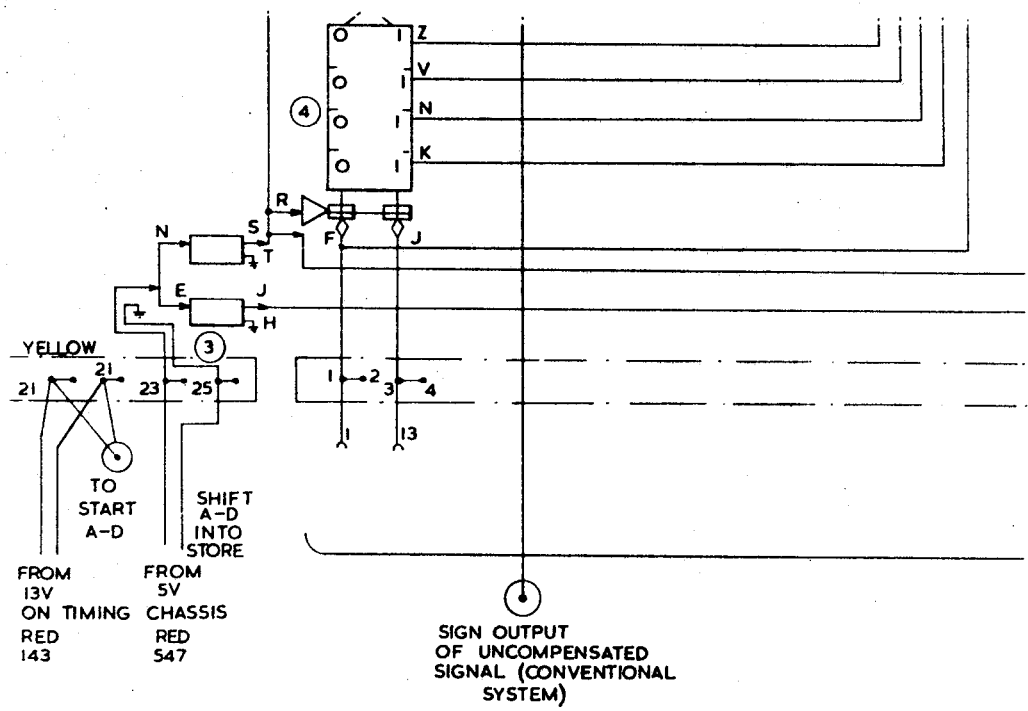
Figure 13E:
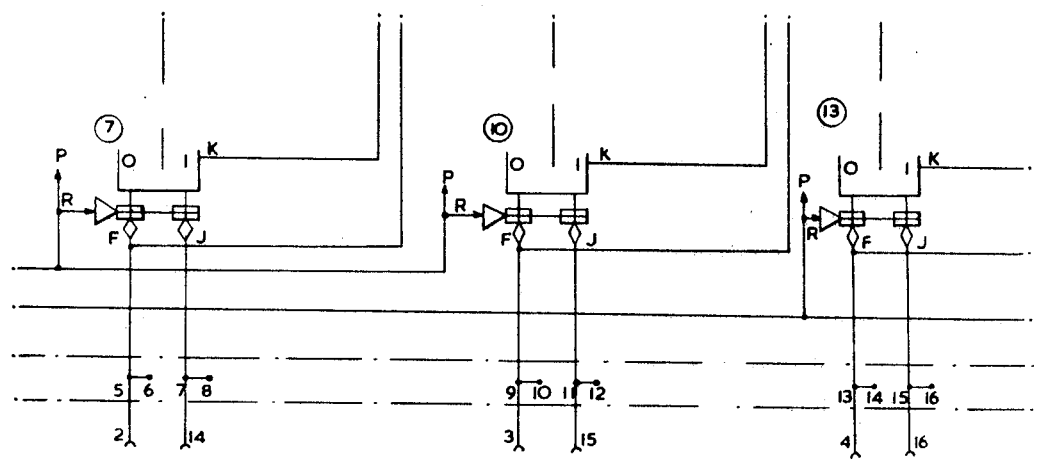
Figure 13F:
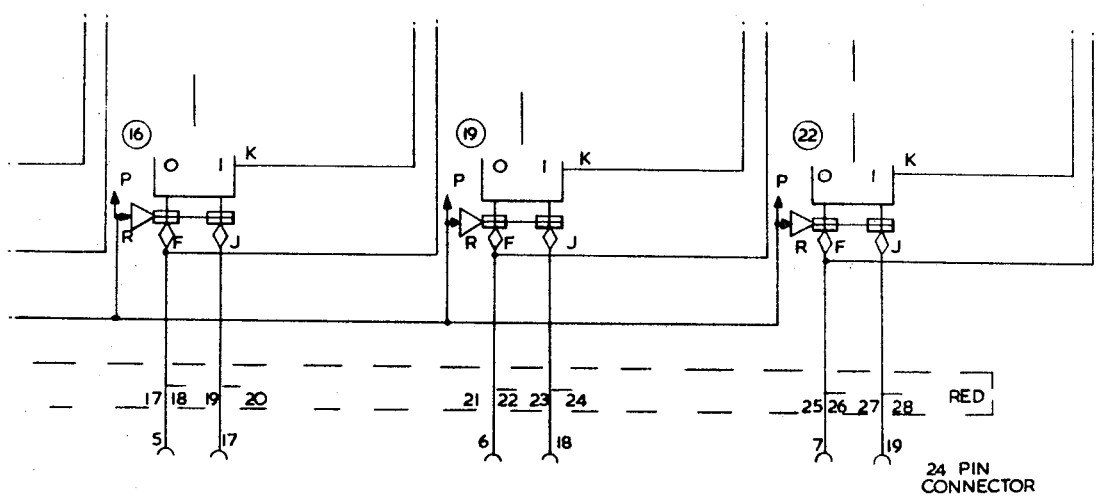
Figure 14A:
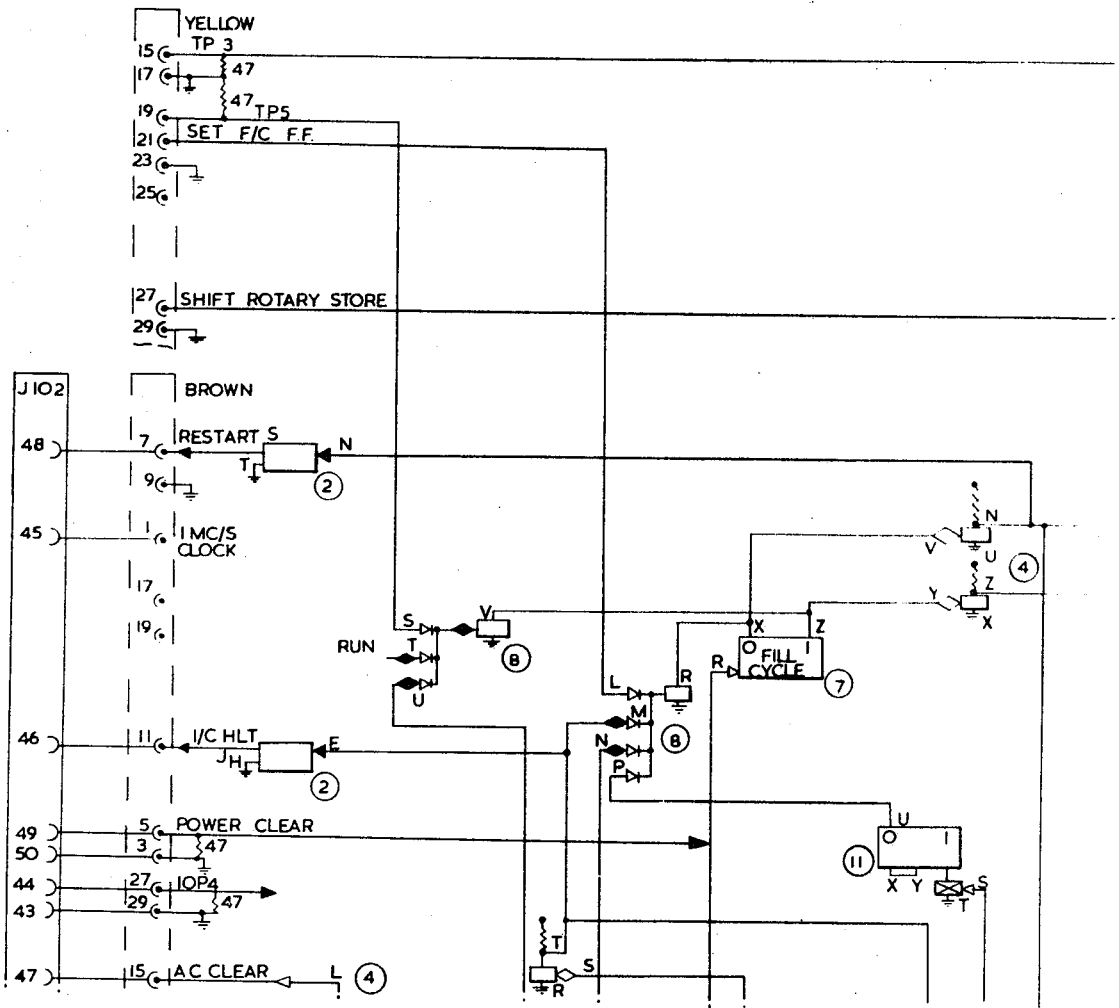
Figure 14B:
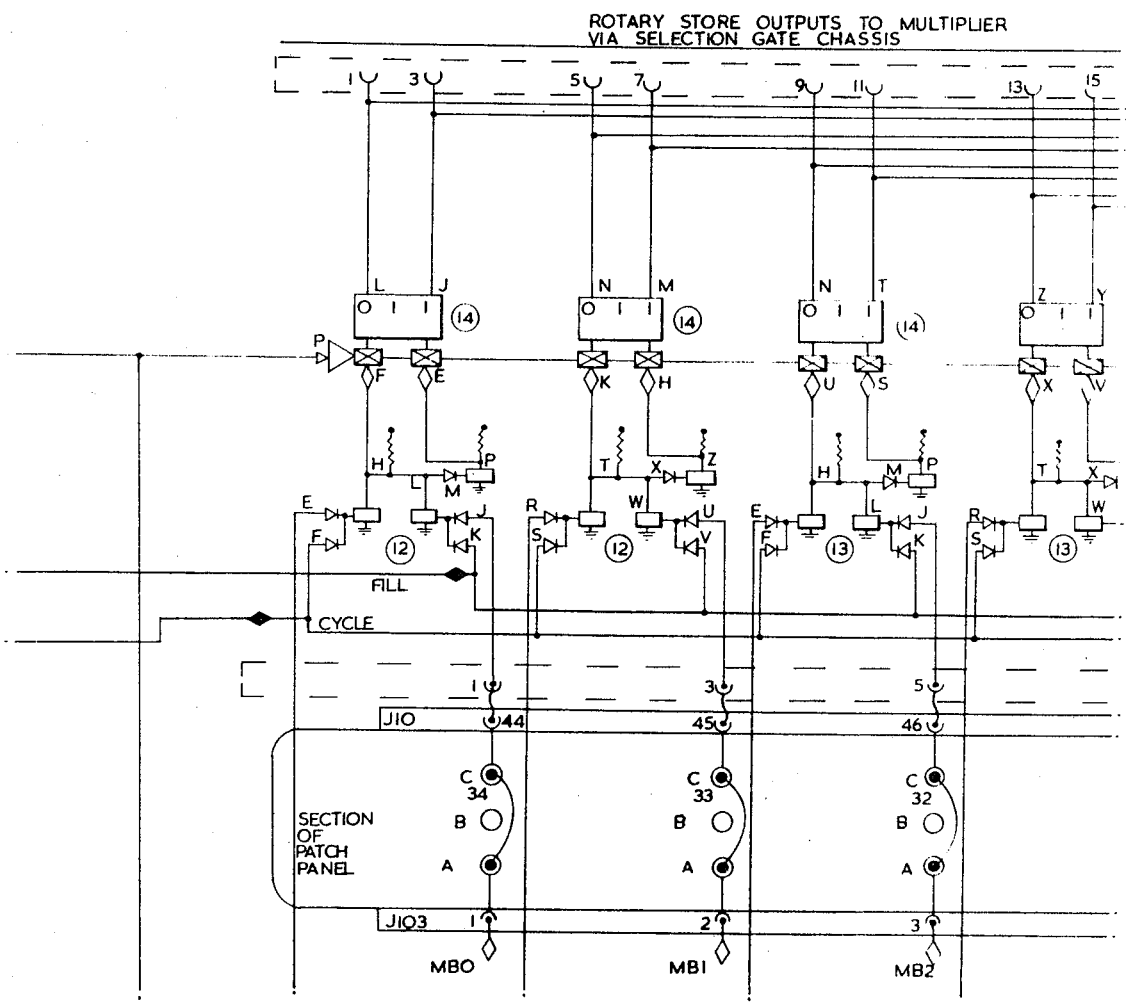
Figure 14C:
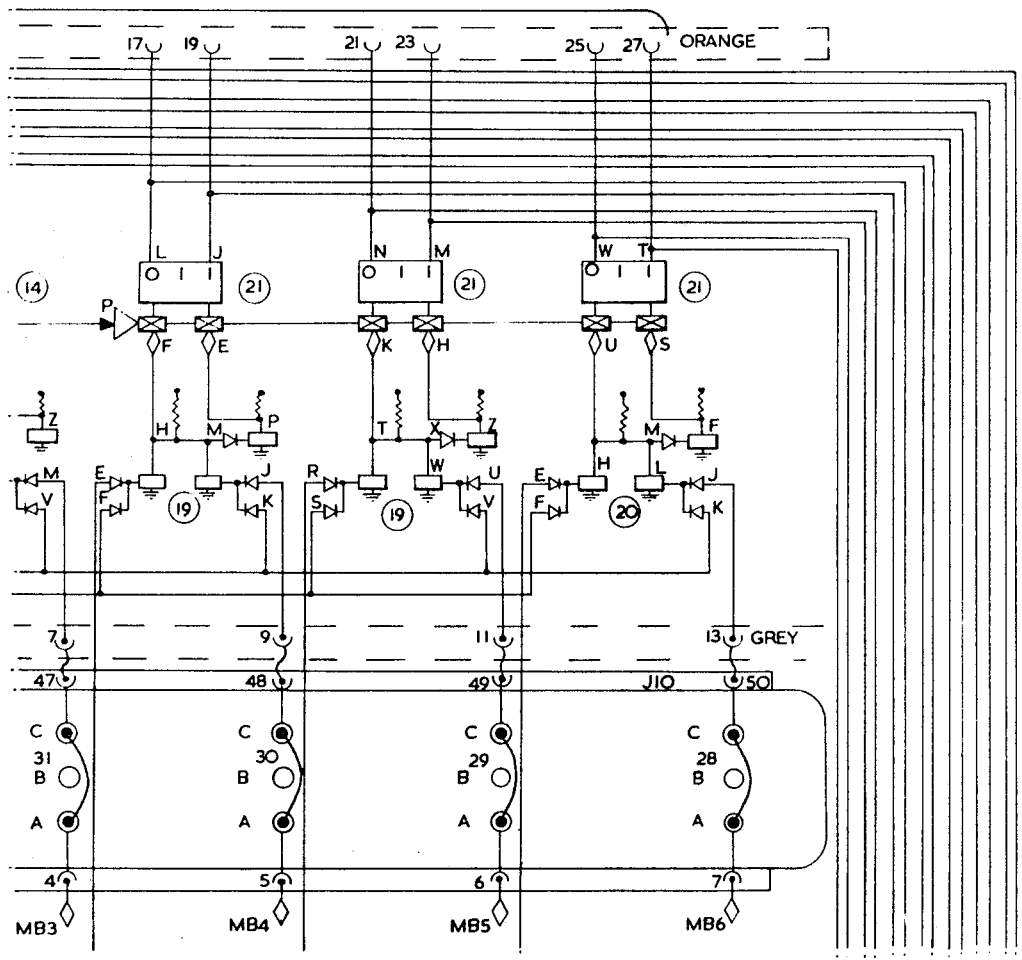
Figure 14D:
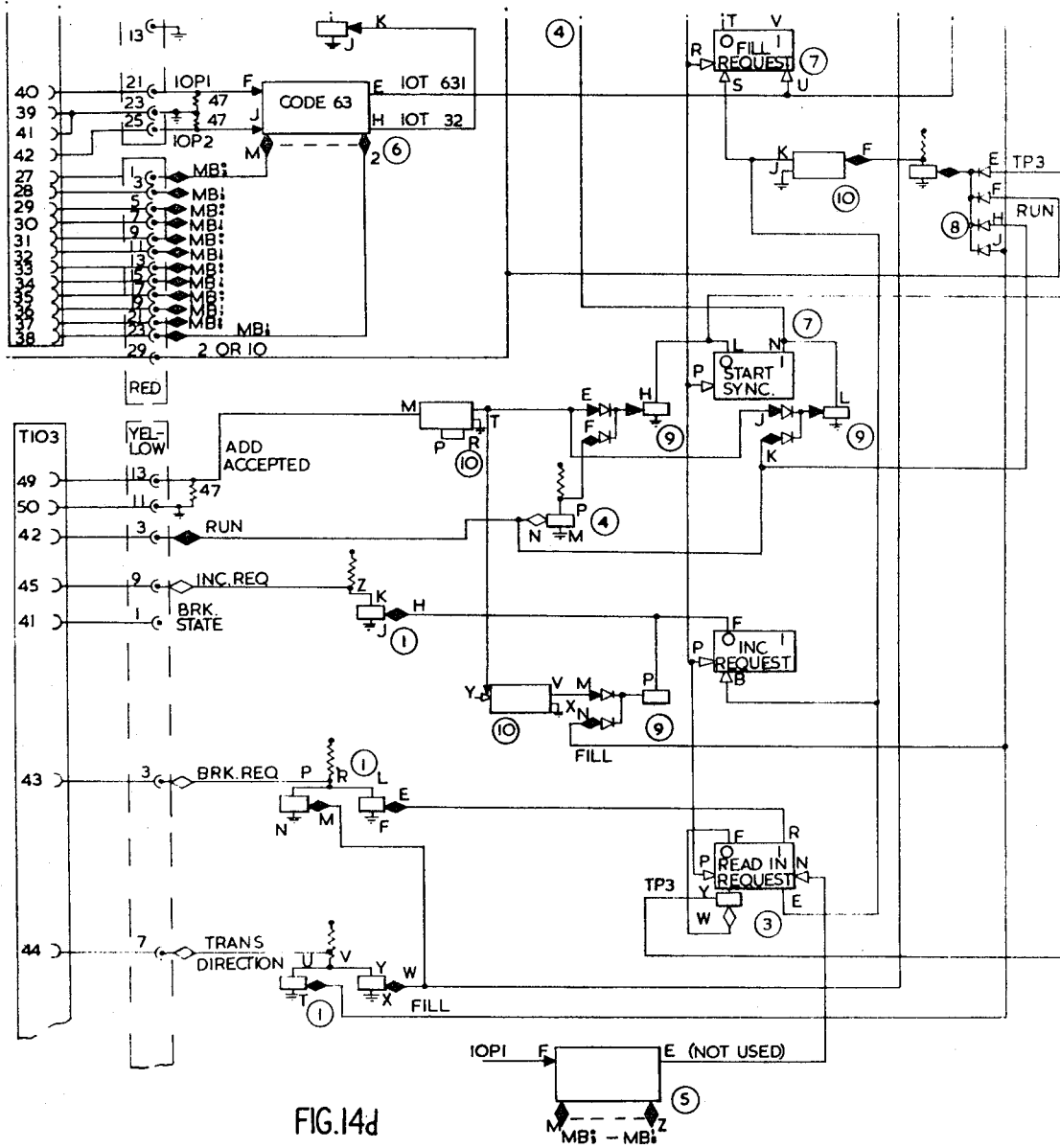
Figure 14E:
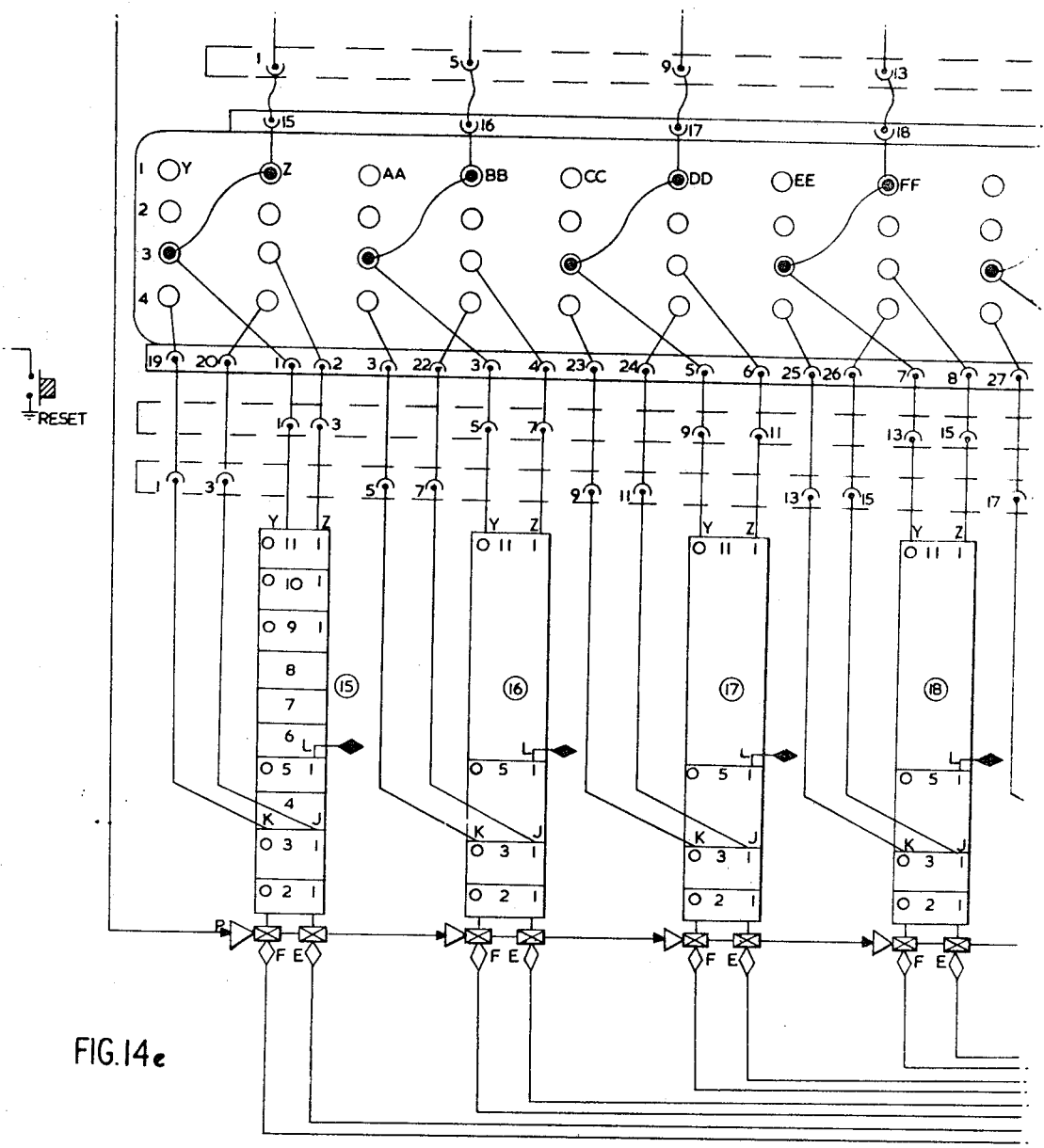
Figure 14F:
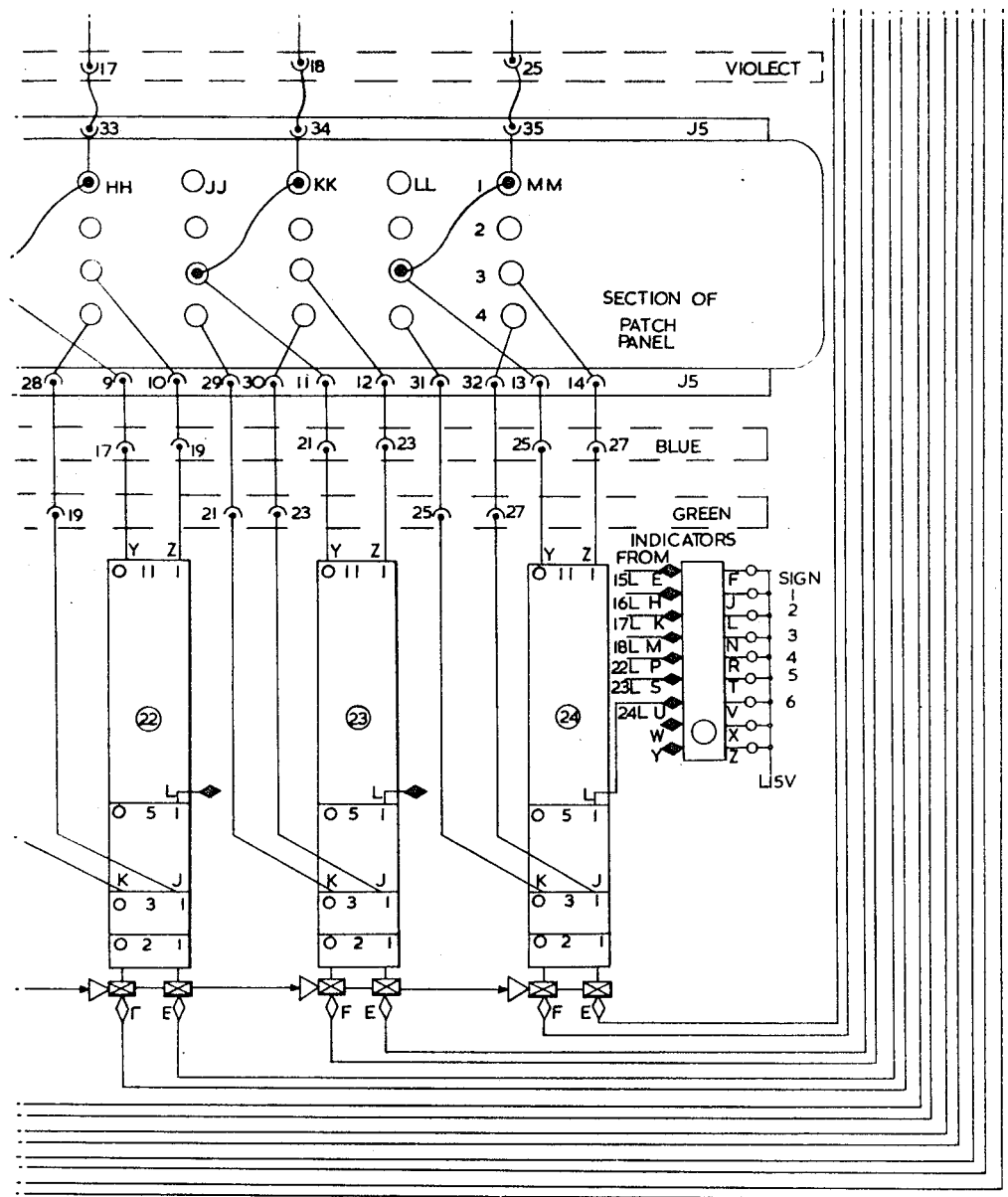
Figure 15A:
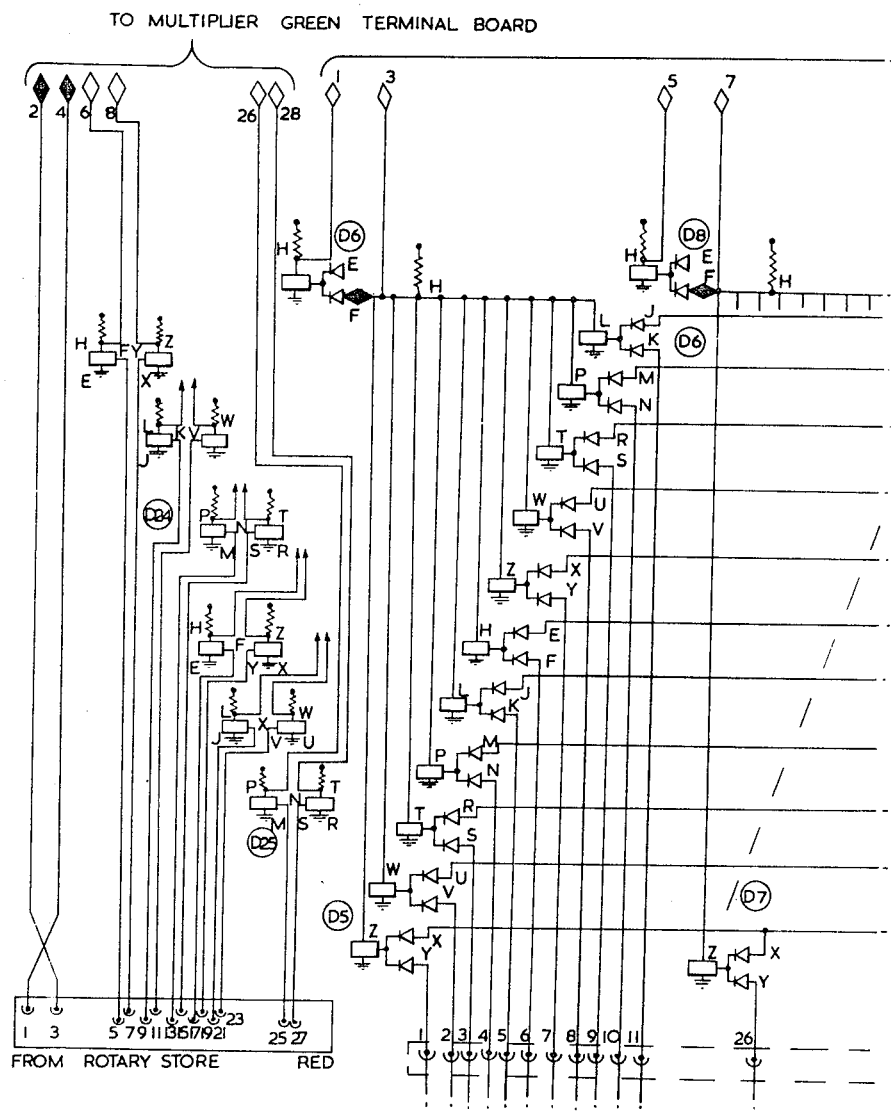
Figure 15B:
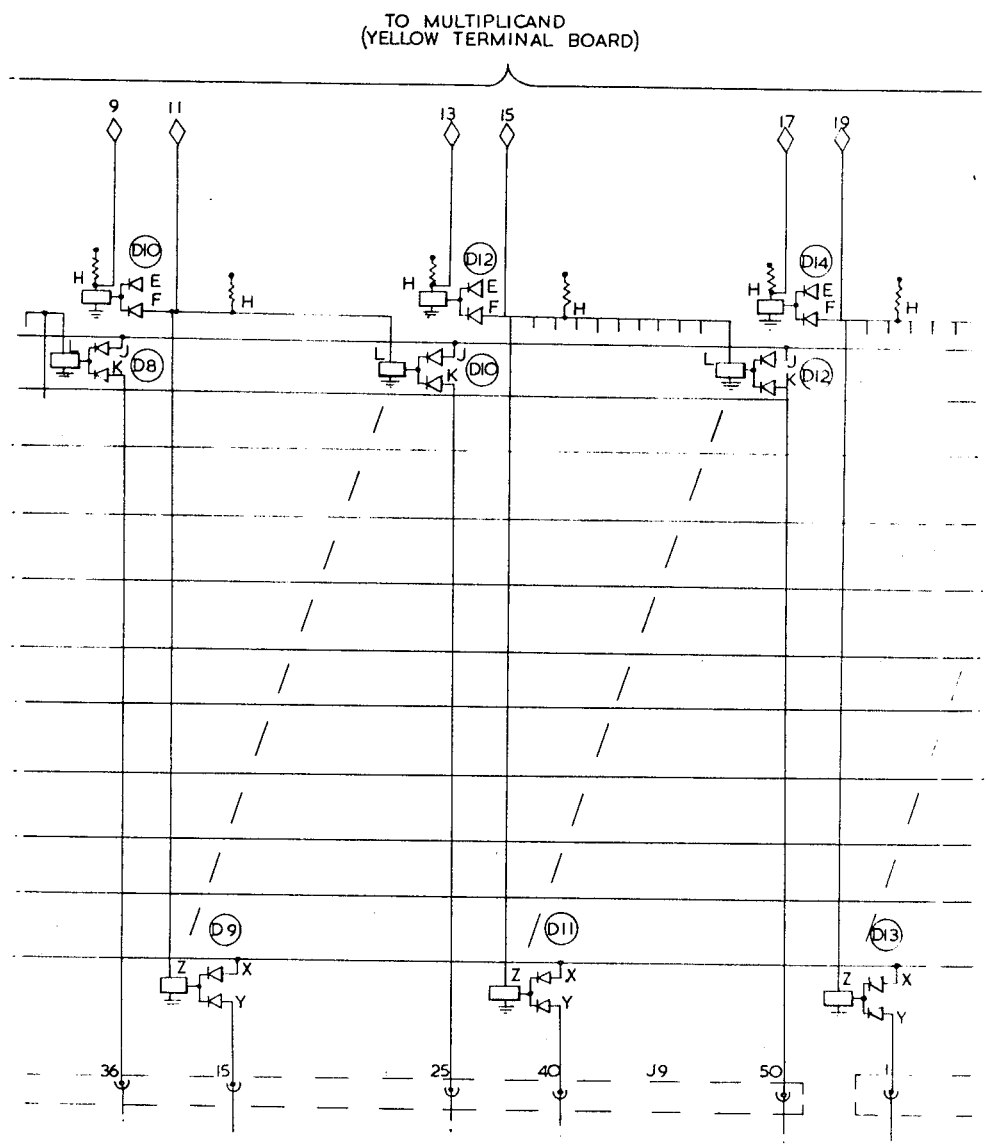
Figure 15C:
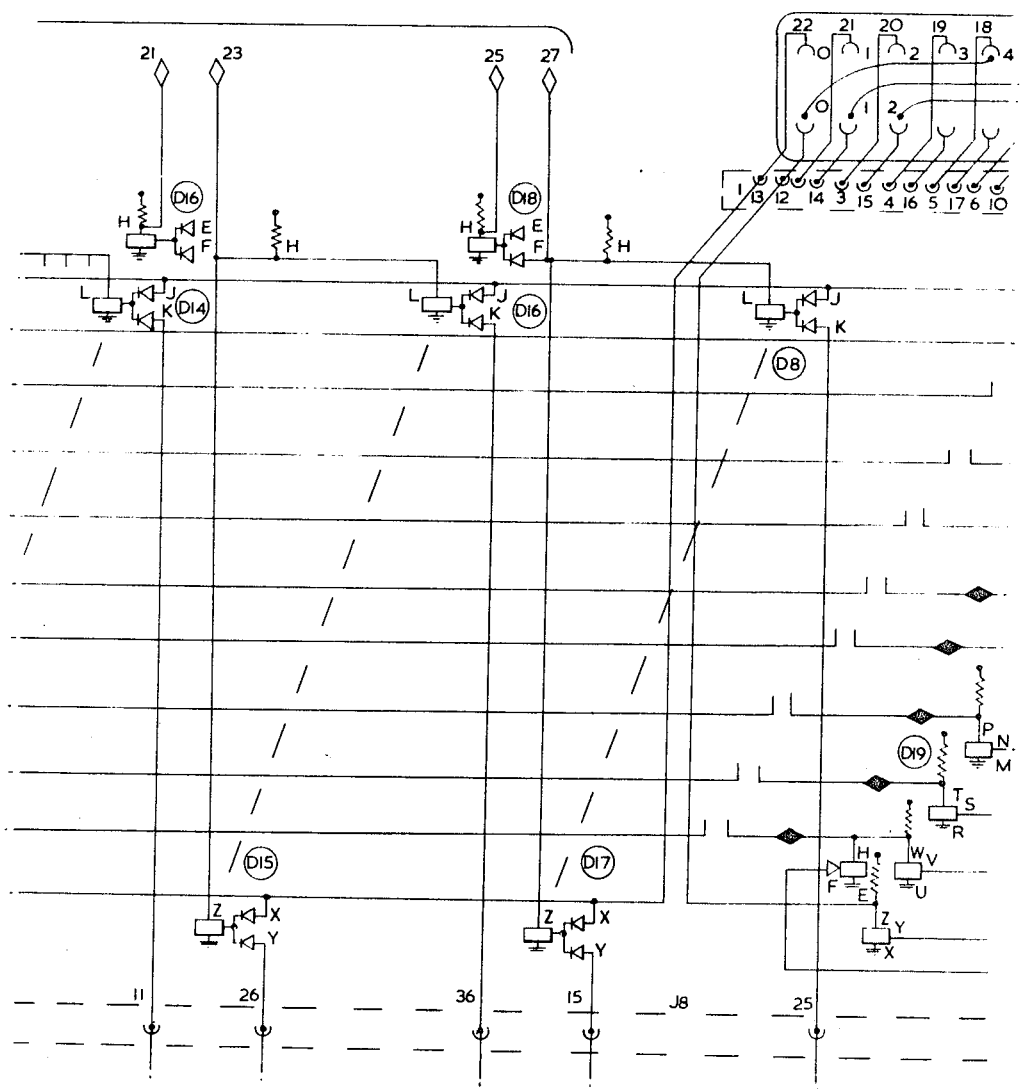
Figure 15D:
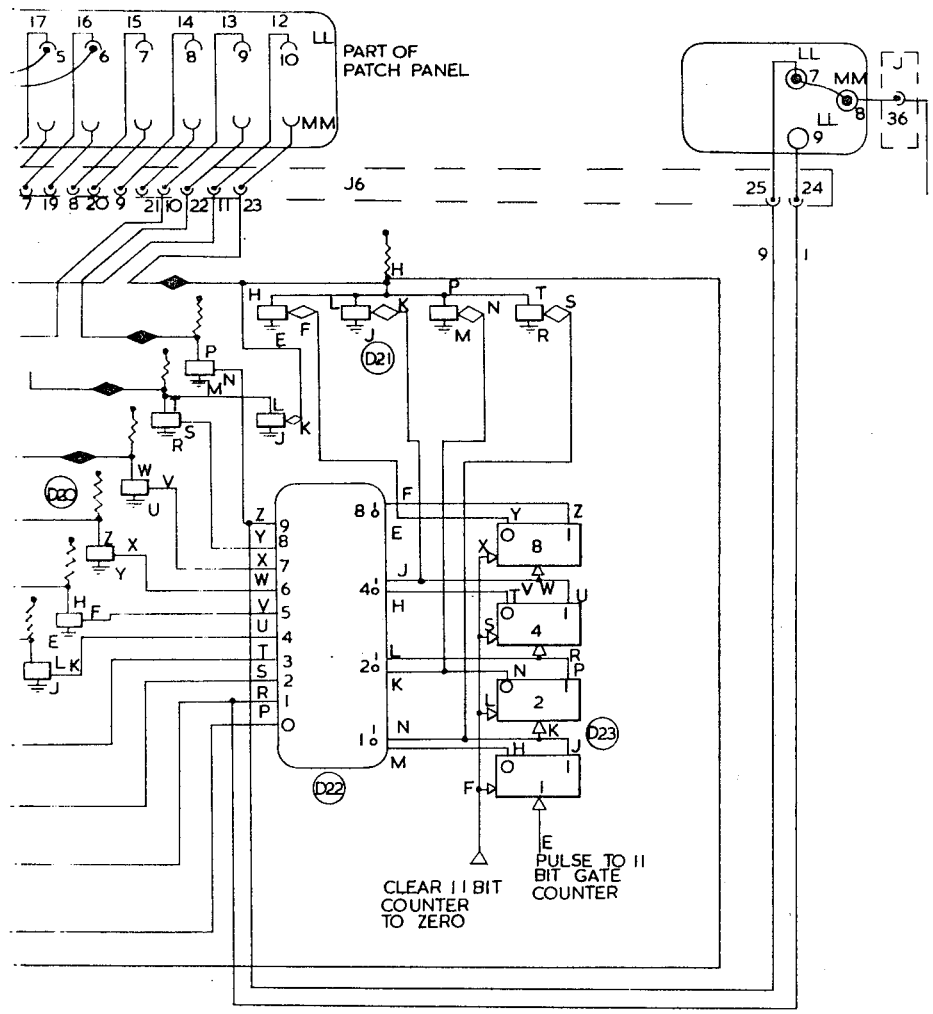
Figure 15E:
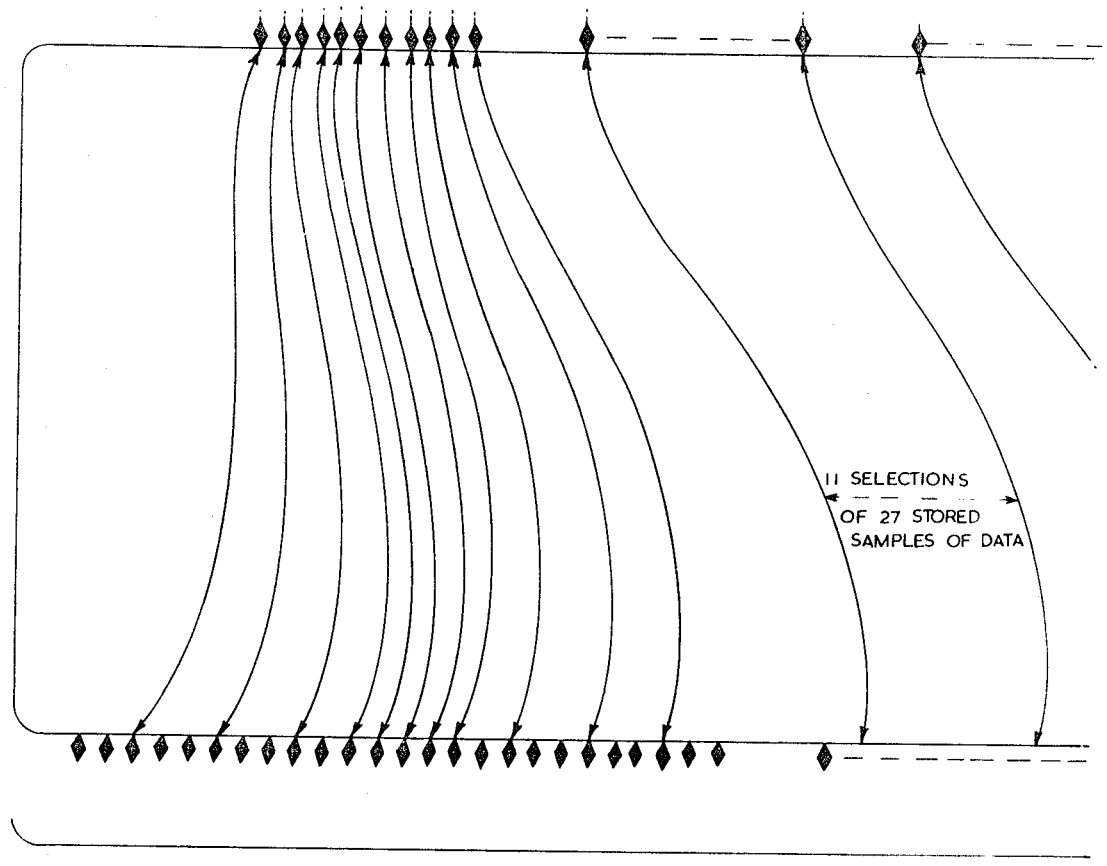
Figure 15F:
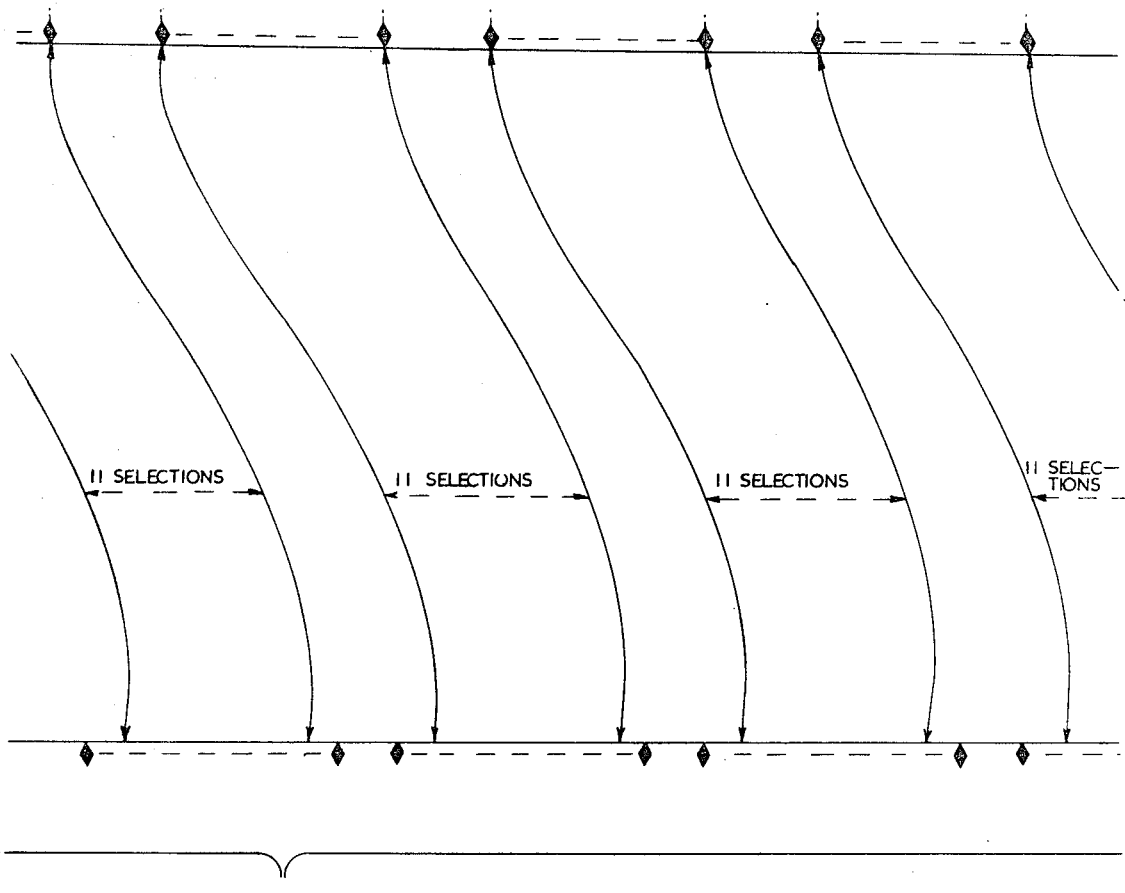
Figure 15G:
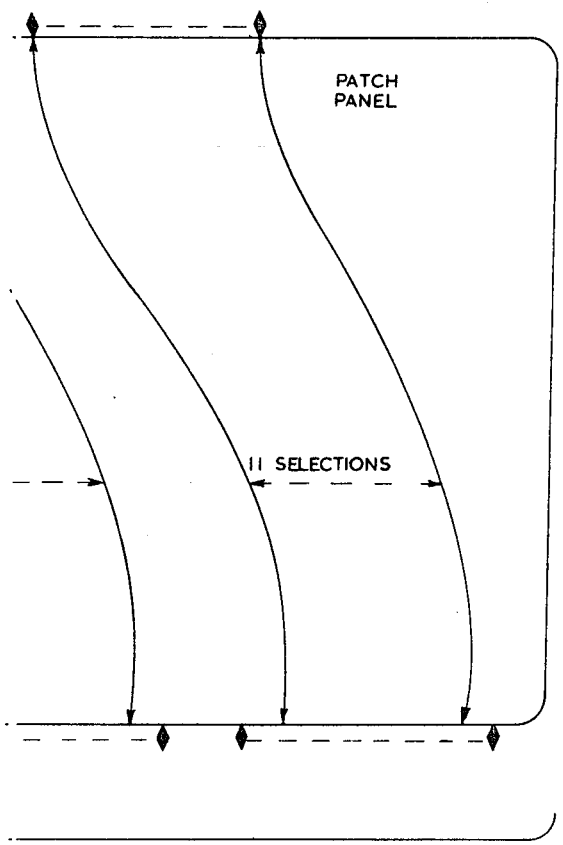
Figure 16A:
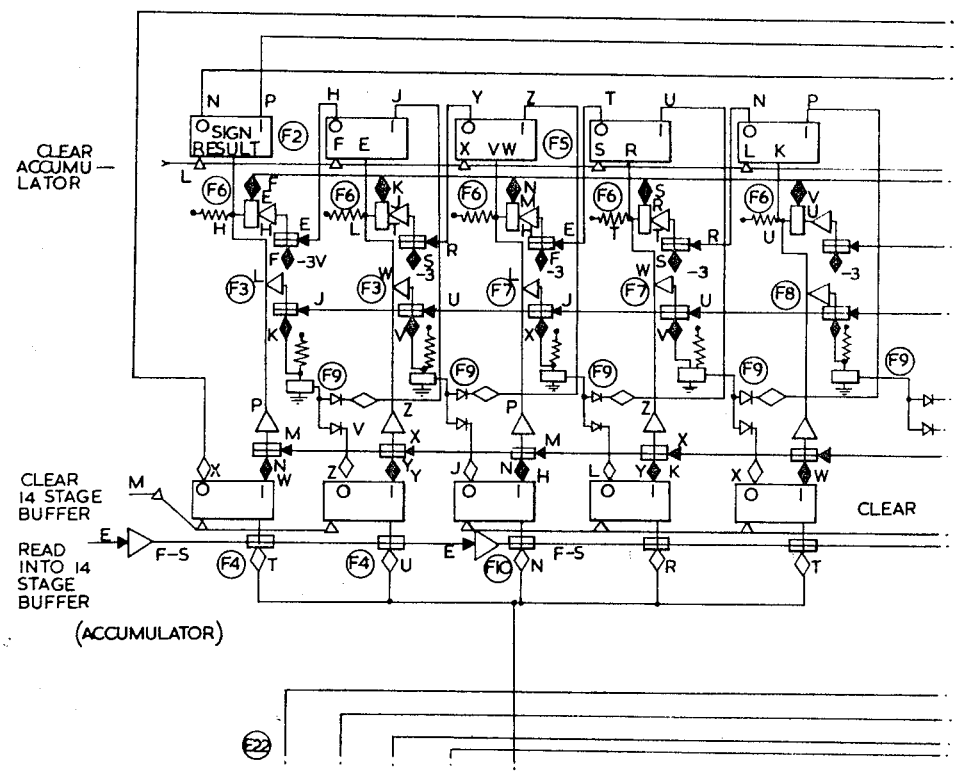
Figure 16B:
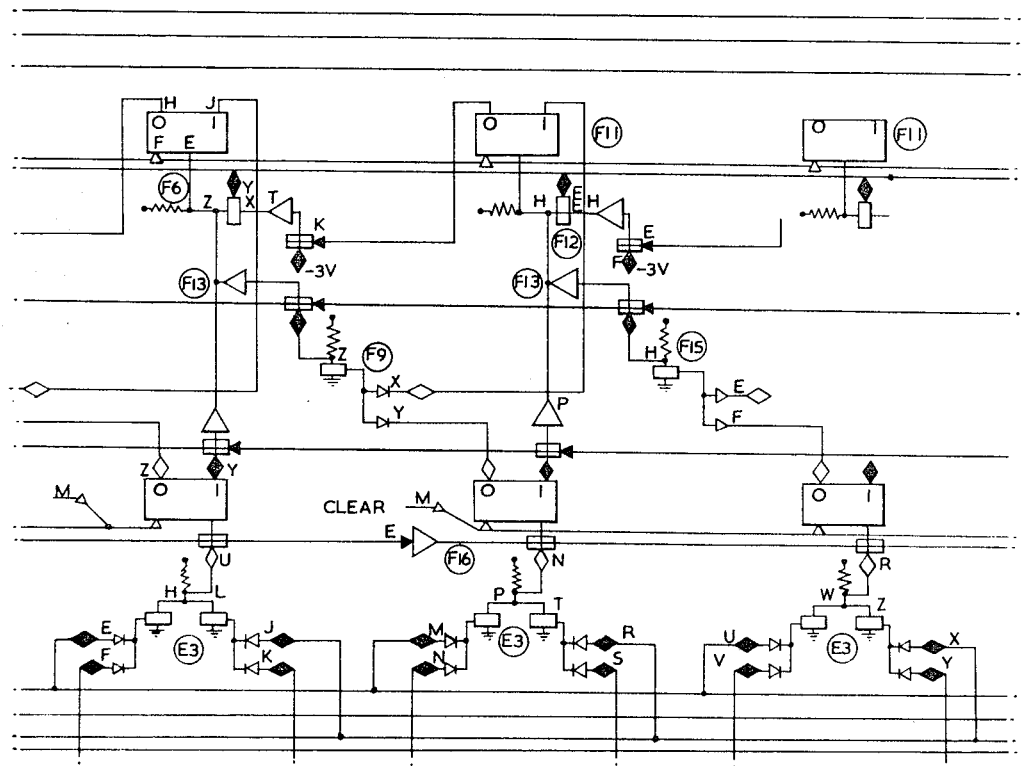
Figure 16C:
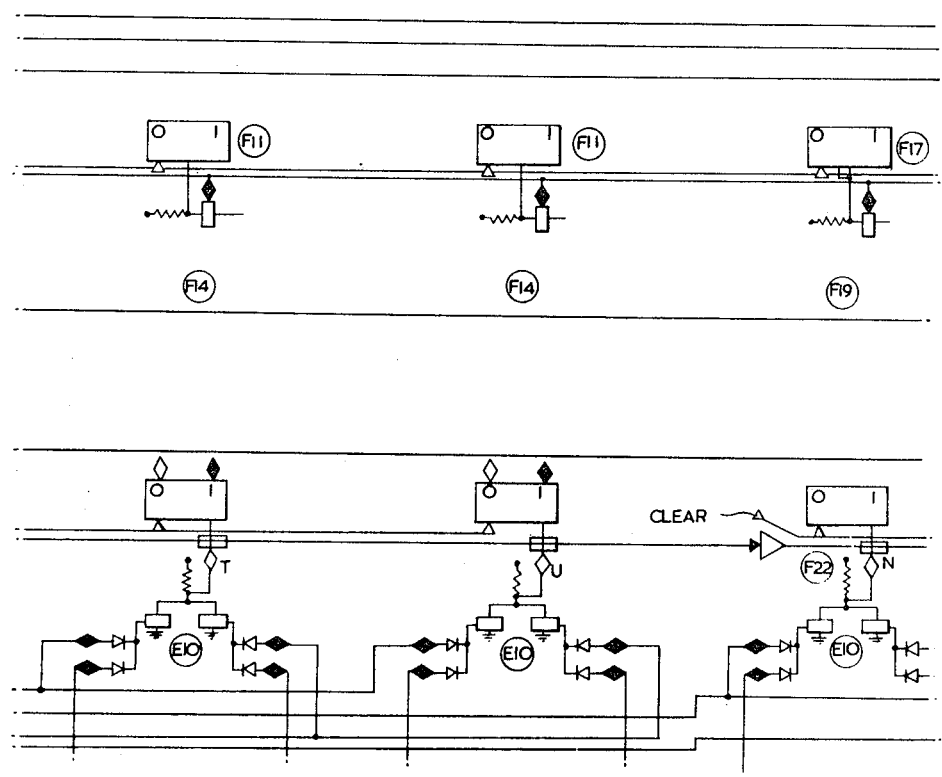
Figure 16D:
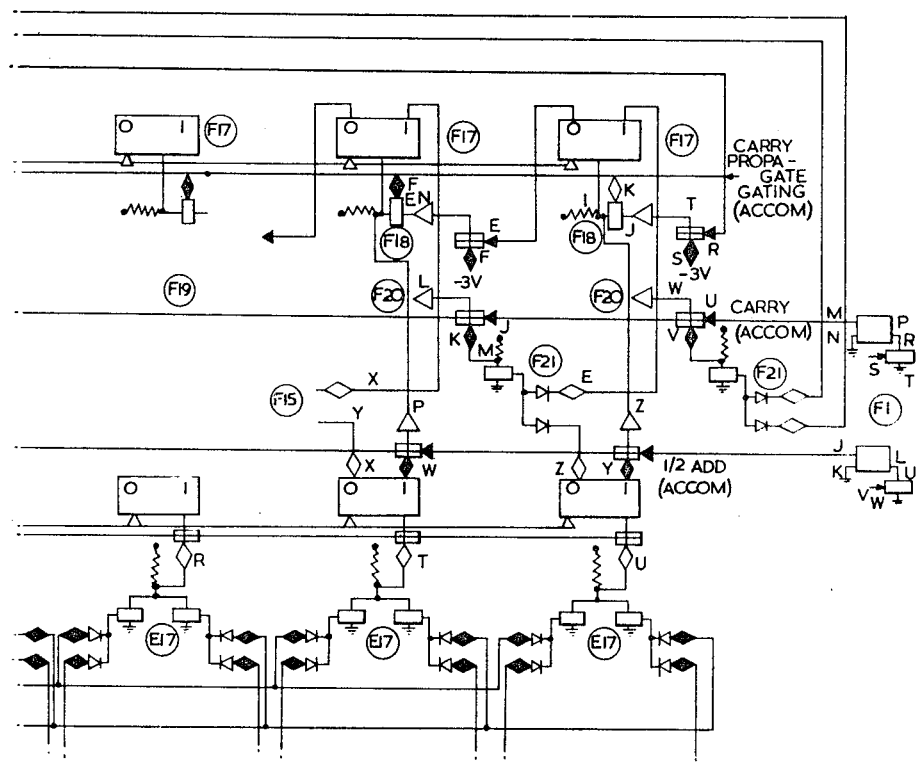
Figure 16E:
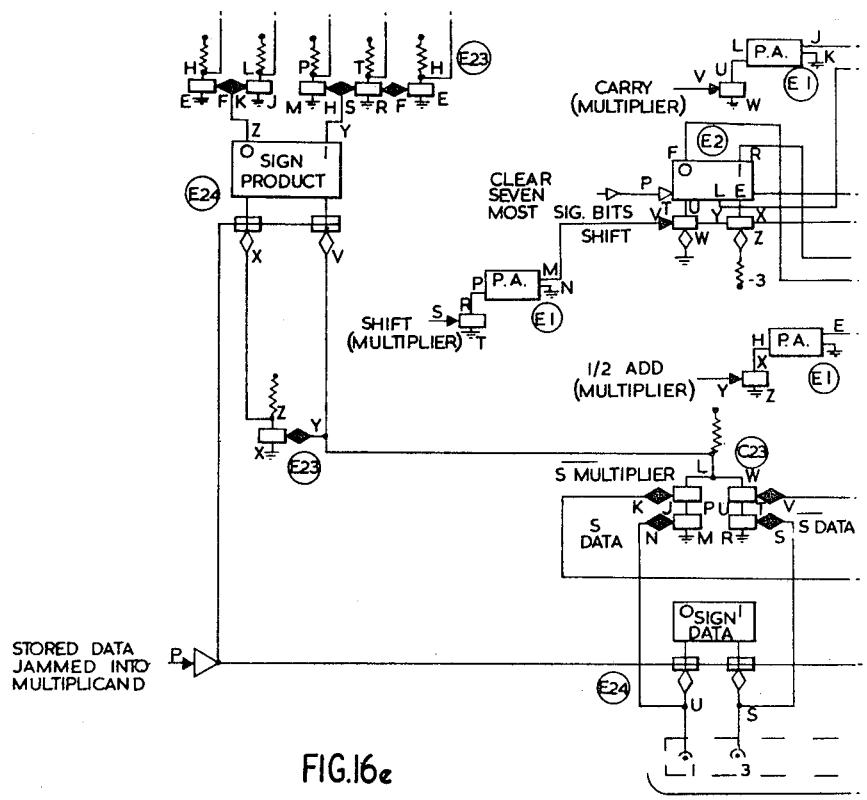
Figure 16F:
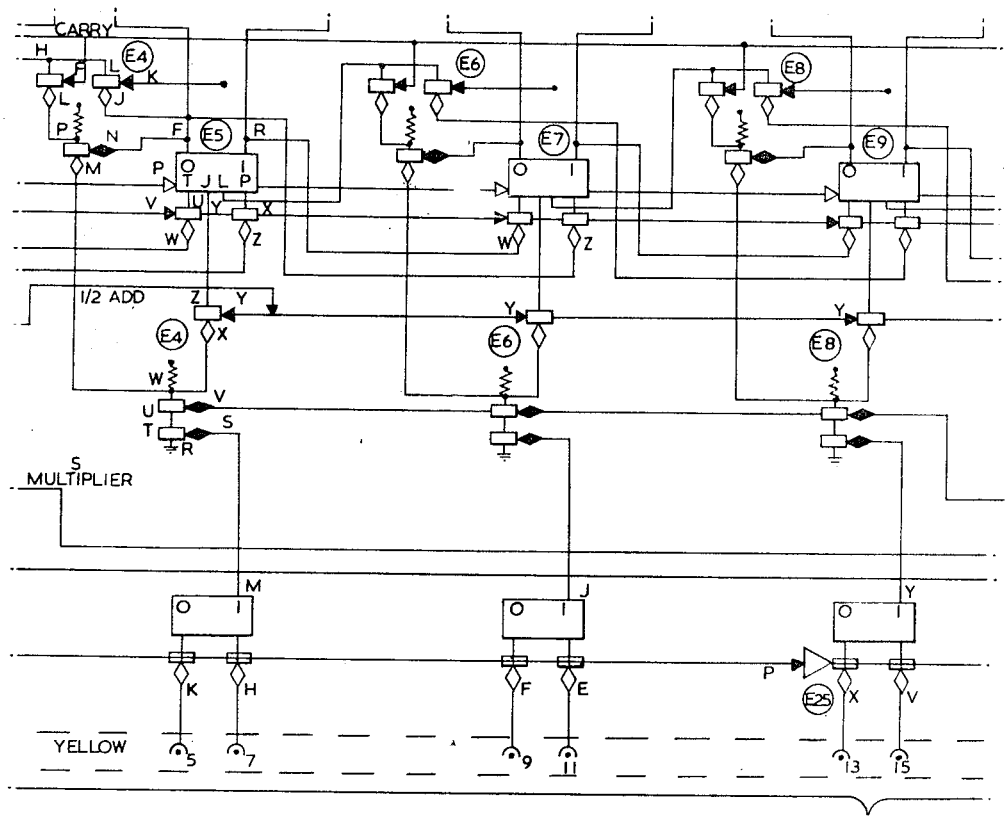
Figure 16G:
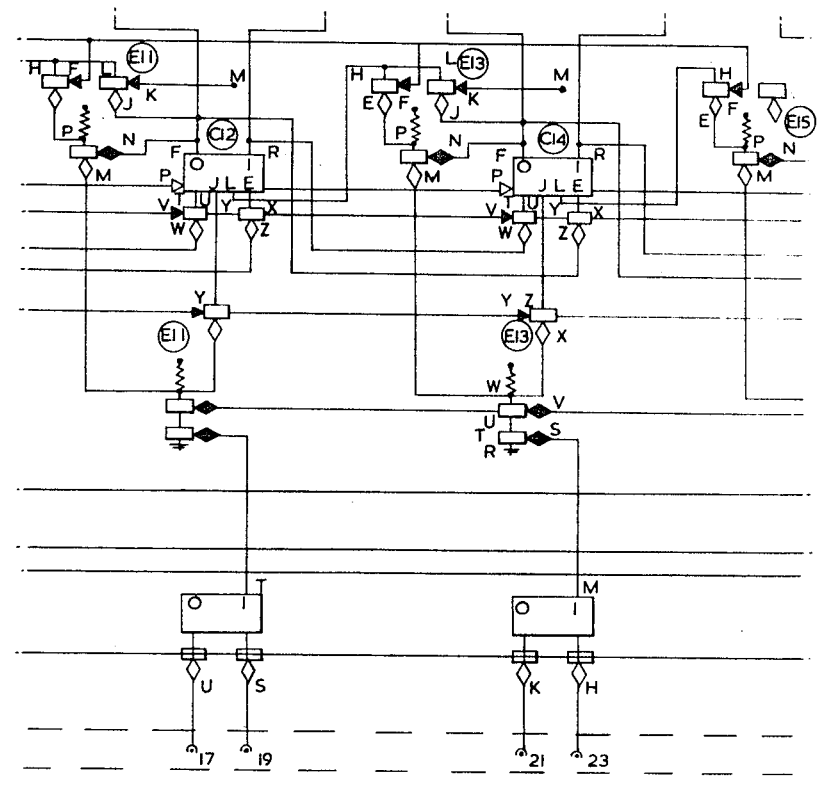
Figure 16H:
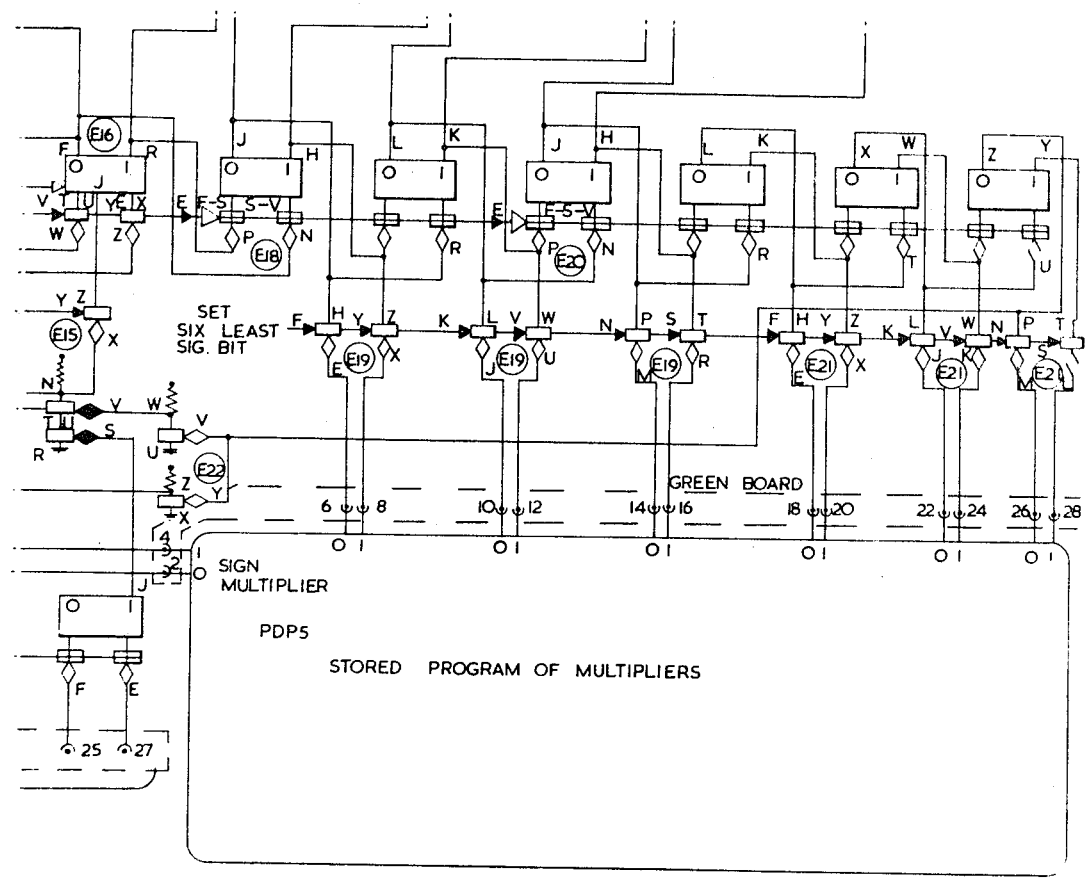
Figure 17A:
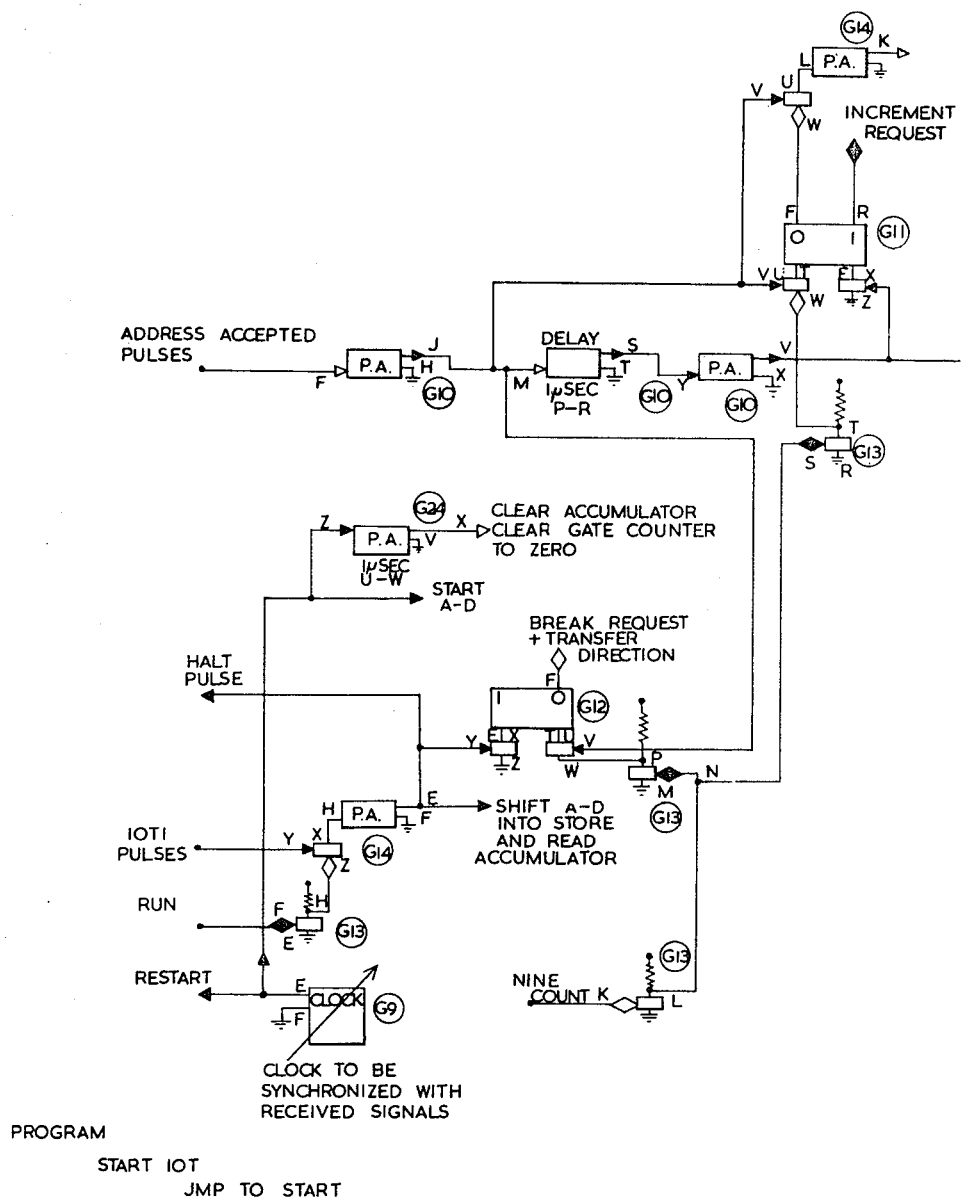
Figure 17B:
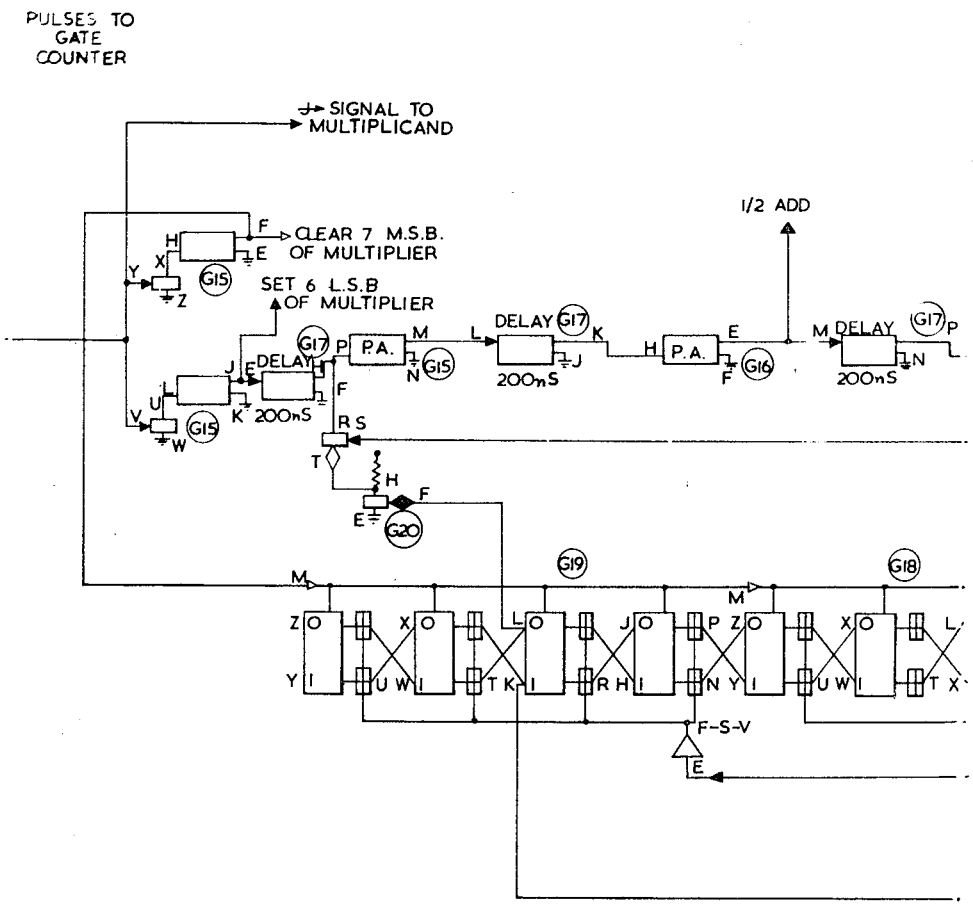
Figure 17C:
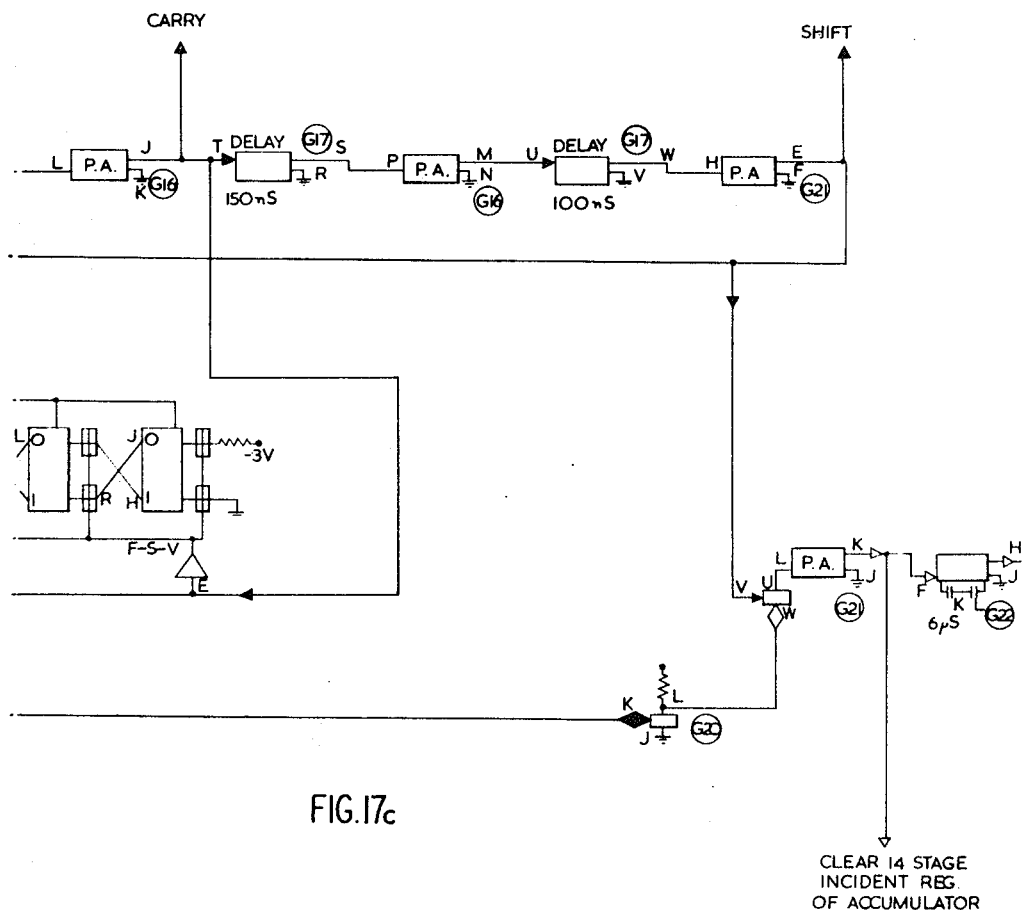
Figure 17D:
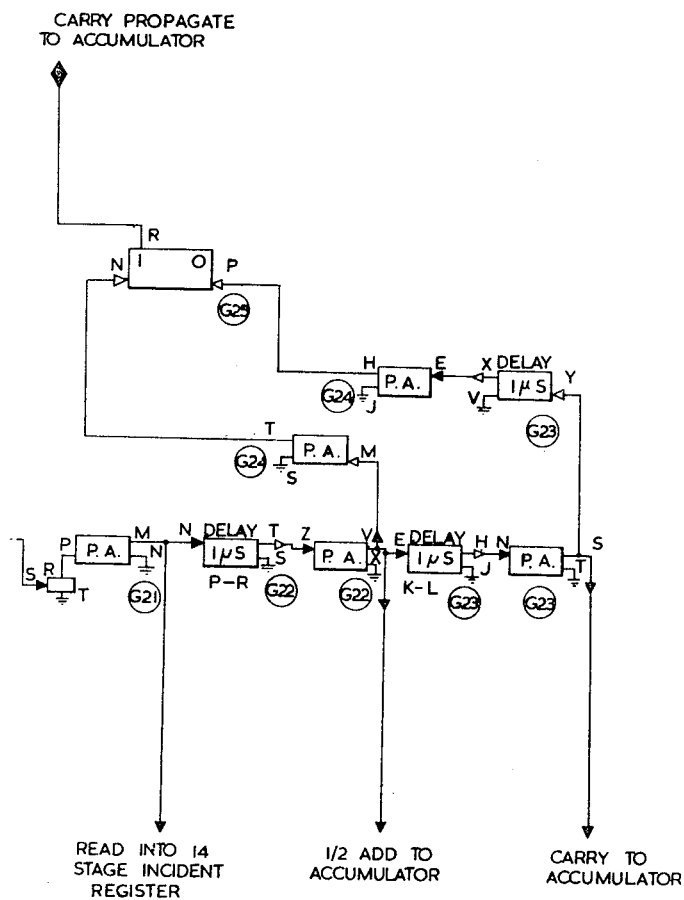
Figure 17F:
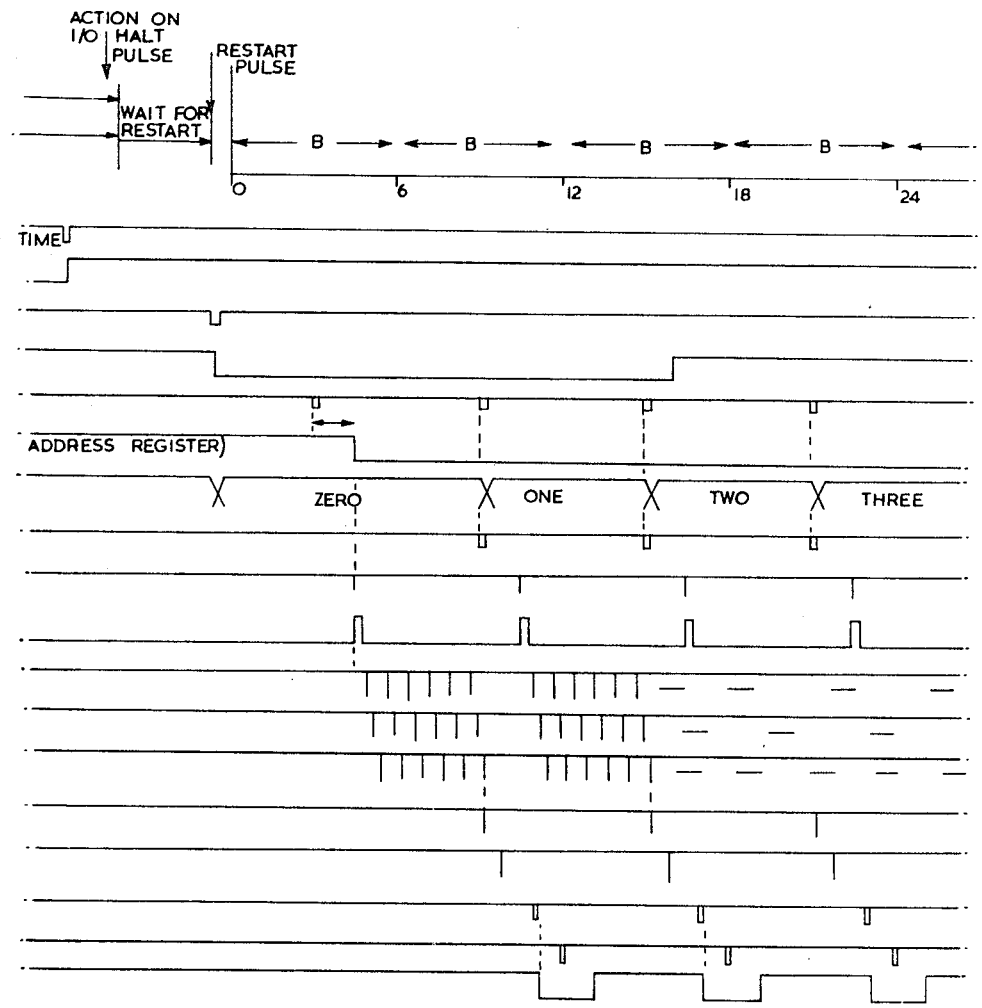
Figure 17G:
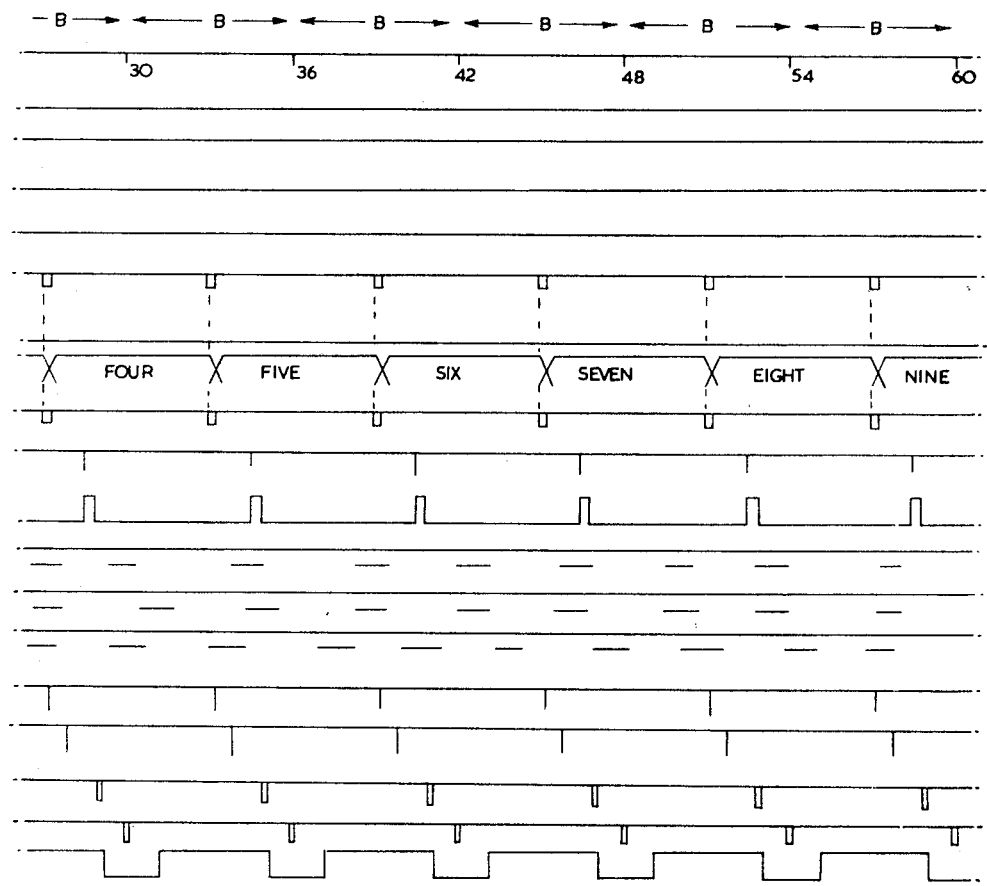
Figure 17H:
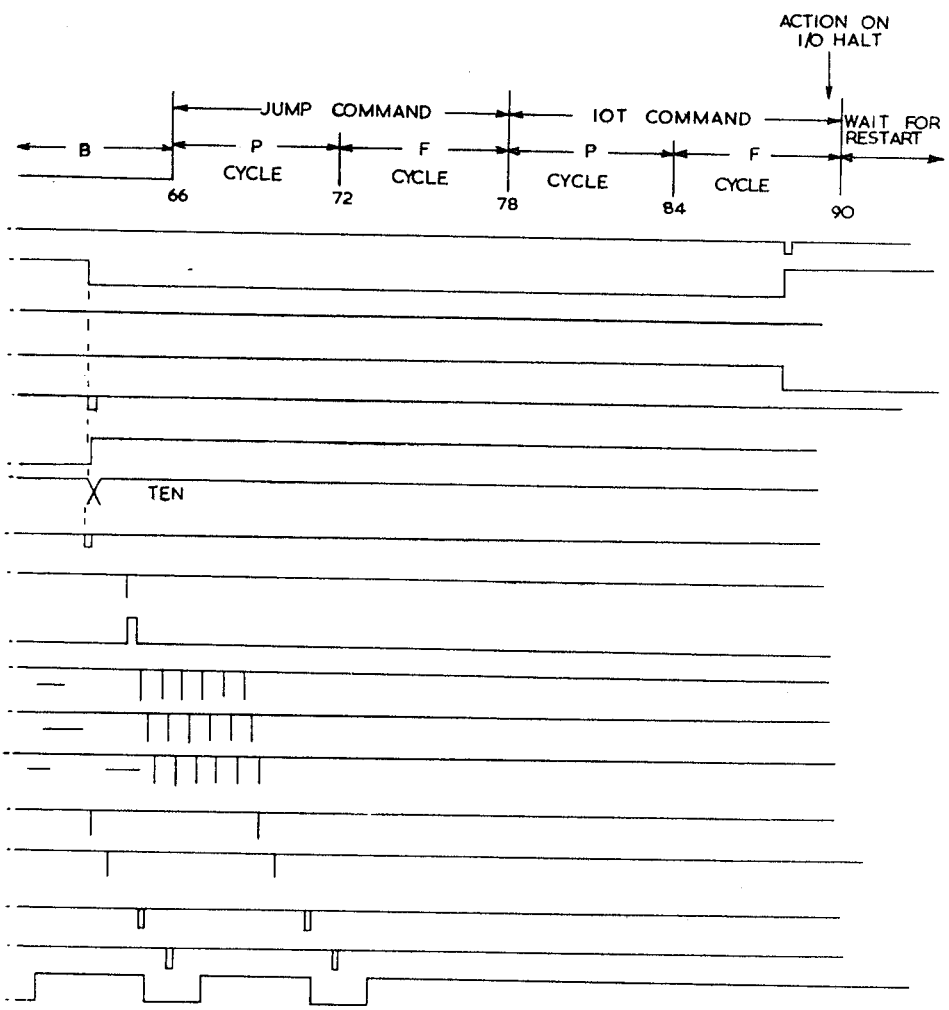

The invention will now be described by way of example, with reference to the accompanying drawings in which:

FIGS. 1a and 1b are block diagrams showing two equivalent forms of receivers,

FIG. 2 is a block diagram showing the receiver of the present invention connected in a communication system, FIG. 3 is a block diagram showing a sampled data compensator constructed from digital circuit units, FIG. 4 is a block diagram of an analog-to-digital converter used in the circuit of FIG. 3, FIG. 5 is a graph showing calculated values of output signal-to-noise ratio for compensators utilizing various numbers of taps, when the received signal is assumed to be rectangular pulses, FIG. 6 is a graph showing calculated values of signal-to-noise ratio for various numbers of taps when the recevied signal is assumed to comprise raised-cosine pulses, FIG. 7 is a block diagram of a receiver having a finite tapped delay line, FIG. 8 is a block diagram of the analog-to-digital store and selection gates circuit, FIG. 9 is a block diagram of the circulating tap gain store circuit, FIG. 10 is a block diagram of the multiplier and accumulator circuit, FIG. 11 is a block diagram of the computer interface with tap-gain store circuit, FIGS. 12a–d comprise FIG. 12 which is a schematic diagram of the analog-to-digital converter, FIGS. 13a–f comprise FIG. 13 which is a schematic diagram of the analog-to-digital store circuit, FIGS. 14a–f comprise FIG. 14 which is a schematic diagram of the tap gain store circuit, FIGS. 15a–g comprise FIG. 15 which is a schematic diagram of the selection gates and patch panel circuit, FIGS. 16a–h comprise FIG. 16 which is a schematic of the digital multiplier and accumulator circuit, and FIGS. 17a–h comprise FIG. 17 which is a schematic diagram of the timing and control circuit.

Pulse signals transmitted through a linear, time-invariant communications channel are generally dispersed in time. When a train of evenly spaced, random amplitude pulses is time dispersed by a linear channel, adjacent pulses overlap and result in intersymbol interference which adds to the background noise. Referring to FIG. 1 there is shown two equivalent receivers according to the present invention capable of providing optimum communications in the presence of the two types of disturbance, intersymbol interference and additive noise. The receiver shown in FIG. 1a consists of a linear matched filter 10 matched to the received signal present at lead 13. The output of the matched filter 10 is connected by lead 14 to a sampler represented hereby an analog-to-digital converter 11. The output of the analog-to-digital converter 11 is connected, via lead 15, to the input of sampled data means in the form of a sampled data compensator 12 having an output connection 16.

The receiver shown in FIG. 1b consists of a linear matched filter 17, matched to the entire received signal, followed by a sampled data compensator 18 having its output connected to a sampling device in the form of an analog-to-digital converter 19. The sampling device (analog-to-digital converter 19) may be connected before or after the compensator as shown in FIGS. 1a and 1b.

The embodiment of FIG. 1a will be described in detail where the analog-to-digital converter 11 is connected between the matched filter 10 and the sampled data compensator 12.

Referring to FIG. 2 there is shown a second block schematic representation of the receiver constructed in accordance with FIG. 1a. The receiver is shown connected in a communication system. The system is divided into two sections, section 21 representing the transmitting circuits and section 22 representing the receiver of the present invention. At the transmitting end an infinite periodic train of randomly positive or negative unit impulses 23 activates a shaping filter 24; forming part of the transmitting section. The transmitter 25 transmits the shaped impulses to the input of the receiver (input of matched filter 10) via a channel 26. The signal passing through the channel is disturbed by intersymbol interference and by the additive random noise. The function of the receiver is to reproduce at its output impulses 27 which are identical to the transmitted impulses 23 and substantially free from intersymbol interference and additive noise, i.e., are substantially undisturbed. The matched filter 10 is adapted to minimize the additive noise in the input information signal whilst the sampled data compensator 12 is adapted to minimize the intersymbol interference.

The matched filter 10 is constructed from a tapped-delay-line (not shown) having its taps spaced sufficiently close to each other such that the impulse response of the matched filter is approximately the inverse of the received signal response i.e., if the received signal is $r(t)$, the impulse response of the matched filter should be $$h(t) = r(-t)$$

In other words, the matched filter 10 is set up in relation to a particular input signal and has an impulse response which is the time-inverse of said particular input signal. The particular input signal is, of course, the channel characterizing signal and is determined by the channel. The component values of this delay line are chosen to suit the required channel response and the element forming this circuit. To set up the matched filter impulse response a single, isolated information pulse is transmitted, i.e., a pulse sufficiently separated from any other pulse that intersymbol interference does not take place. At each tap of the delay line, the corresponding received signal is examined (with additive noise taken into account) and the tap gain is set accordingly. This step is repeated for every tap of the delay line which represents a time delay portion of the response of the channel. If the noise on the channel is severe, it may be necessary to average several received isolated signals in order to determine the correct value for the tap-gain values.

The tap outputs of the delay line are fed to an integrator (not shown) to provide a step-function approximation of the desired response. The output from the matched filter circuit which still contains errors is fed to an analog-to-digital converter 11 whose function is to convert the signal into its digital components. The output of the matched filter may also be connected directly to the sampled data compensator 12 as shown in FIG. 1b. FIGS. 5 and 6, which will be described later, show the signal-to-noise ratio at the output of the matched filter, when the received signal is assumed to be a rectangular pulse or a raised-cosine pulse.

In the case of the sampled data compensator 16, a delay line 20 (shown in block diagram) having a plurality of taps 28 is used. Any suitable number of taps may be used in the delay line. In some instances three taps have been found adequate, although in many cases eleven taps have been required depending on the received information signals. The delay line taps 28 are separated by the symbol transmission times, that is the time delay between the taps of the delay line is the same as the separation between the times at which the symbols are transmitted. The impulse response of the sample data compensator is determined by the noise level, signalling rate, and channel response.

The tap gains of the delay line 20 of the sampled data compensator 12 may be set in a number of ways. In one method, the tap gains may be calculated for a wide variety of the determining parameters. These tap gain values could be stored in a computer and a particular set used for the impulse response whenever the parameters were appropriate. In a second method the tap gains may be calculated and used immediately. In a further method, a computer can monitor the signal-to-noise ratio at the receiver output and systematically alter the impulse response of the sampled-data compensator to maintain optimum performance.

Once the impulse response is calculated and set an automatic adjustment, forming part of the apparatus, will function until conditions change to such an extent that another measurement is required.

The impulse response of the sampled data compensator is given by:

$$f(t) = \sum_{i=-M}^{N} A_i \delta(t - (i+M)T) \quad (1)$$

where:

$\delta(t)$ is the unit impulse function and

T is the separation between transmitted symbols, i.e., it is the inverse of the signalling rate, M and N are parameters determining the size of the sampled-data-filter, and MT is the delay required to make $f(t)$ realizable.

The tap gains $A_i$ are determined by (i.e. they are the solutions of) the set of simultaneous linear equations:

$$\sum_{j=-M}^{N} A_j \left\{ N_0 C(i-j) + \sum_{n=-\infty}^{\infty} C(i-n)C(j-n) \right\} = C(i) \quad (2)$$

where $N_0$ is the power spectral density of the additive noise and $$C(i-j) = \int_{-\infty}^{\infty} S(\tau - iT) S(\tau - jT) d\tau \quad (3)$$

is the autocorrelation of $S(t)$, the signal received when a signal, isolated, symbol is transmitted, also, $$C(i) = \int_{-\infty}^{\infty} S(\tau - iT) S(\tau) d\tau \quad (4)$$

The solution of Equations 2 is dependent upon the autocorrelation function 4 being negligible for arguments beyond some value, i.e.

$$C(i) \equiv 0 \text{ for } i > I \quad (5)$$

Condition 5 should be met by any signals received in practical systems.

One way of constructing a tapped delay line is through the use of digital equipment. An actual digital circuit for the sampled data compensator is shown in FIG. 3. The conversion accuracy in these circuits is chosen to be 7 bits. The delay line taps are represented by the analog-to-digital converter 11 and an A-D store 29. The tap spacings are equal to the intersymbol period, that is the time interval between the symbols being transmitted.

The output from the matched filter is connected to the input of the analog-to-digital converter via lead 14. The digitized samples at the output of the converter 11 are stored in the A-D store circuit 29. Access to the signal in the converter 11 is also provided to the computer 33 via connection 35. A switch 36 provides connection of the input 39 of the tap gain store circuit 34 to the output of the digital computer 33, via switch contact 37, and to its output 40 via switch contact 38. This is necessary such that a computation of the tap gain may be stored in sequence with the symbol rate such that the symbols may be multiplied by their respective tap gains when fed to the multiplier circuit 30. The output 40 of the tap gain store circuit 34 also connects to a second input of the multiplier circuit 30. The output of the A-D store circuit 29 connects to a first input of the multiplier circuit 30, via a selection gate circuit 41. The products of the multiplier circuit 30 are accumulated in an accumulator circuit 31. The accumulator 31 a binary output 45 and a digital output 46. The digital output 46 may be connected to a digital-to-analog converter 42 to provide an analog output if desired. A feedback connection 47 is also provided from the digital output 46 to the digital computer 33 so that the computer continuously checks the output signal-to-noise ratio and automatically adjust the gains of amplifiers 28 to compensate for any deviation in the signal-to-noise ratio.

The operation of the digital circuits forming the tap delay line for the sampled data compensator is synchronized by a timing and control circuit 32. A synchronizing pulse, in synchronism with the transmitted signal, is connected to the input 48 of the timing and control circuit 32. The digital computer 33 and the timing and control circuit 32 connect to each other via connection 49. The timing and control circuit also connects to each of the circuits forming the sampled data compensator.

Many sets of tap gain values may also be stored in the digital computer, each corresponding to a different transmission rate, and for a different channel response. The computer may also be used for adaptive control of these tap gains as the additive noise level or the transmission rate changes. As shown in FIG. 3, a X-Y display unit 43 and a light register unit 44 is connected to the digital computer. These are used for monitoring the system operation.

Referring now to FIG. 4 there is shown a block diagram of the analog-to-digital converter circuit 11. The input of the analog-to-digital converter 11 comprises a track and hold circuit 60 whose output connects to a first input of a comparator circuit 61. The second input of the comparator circuit 61 is connected to the output of a digital-to-analog converter circuit 65. The output of the comparator circuit is connected to a first input of a clock and gates circuits 62. A second input connection is also provided in the clock and gates circuit 62 to connect a control signal thereto and to also connect to the track and hold circuit 60. The clock and gates circuit 62 has three output connections. One of these is the conversion connection whilst the other two connect to the output register 63 and the timing register 64, respectively. The output and timing register combine in a single output which provides the desired digital output and also connects to the digital-to-analog converter circuit 65. Also connected to the digital-to-analog converter circuit 65 is a reference supply circuit 66.

Referring to FIGS. 8 to 17 inclusive, there is shown detail block diagrams and schematic diagrams of the remaining circuits forming the sampled data compensator as shown in FIG. 3. These circuits will not be described in detail but are being referred to herein to show the specific design of these circuits forming the present embodiment.

SIGNAL-TO-NOISE RATIO

The sampled data compensator 11 provides an output signal in which the noise is minimized. This is achieved by providing a compensator which will maximize the signal-to-noise ratio. The ratio is defined by the formula, $$S/N \ MAX. = \frac{S^2}{\overline{n^2} + \overline{i^2}}$$

where:

S = the signal output at time representing the output information.
$\overline{n^2}$ = mean square noise output
$\overline{i^2}$ = the mean square output due to signals representing information transmitted at all other times $$[\overline{i^2} = \sum \overline{i^2}]$$

Typical curves showing the signal-to-noise ratio as a function of symbol separation for a background signal-to-noise ratio of 20 db (with intersymbol interference) are shown in FIGS. 5 and 6. The curves shown in FIG. 5 were caluculated with a received signal of rectangular form as designated by numeral 70, whilst those shown in FIG. 6 were calculated for a raised-cosine signal, designated by numeral 80.

Referring to FIG. 5 there is shown the signal-to-noise characteristics at the output of the matched filter and at the output of the sampled data compensator when the received signal is considered to be a rectangular signal 70. The signal-to-noise ratio at the output of the matched filter is represented by curve 71. Curves 72, 73 and 74 show the signal-to-noise ratio characteristics at the output of the sampled data compensator. Curves 72, 73 and 74 represent sampled data compensators having tap delay lines with 3, 5 and 11 taps, respectively. Curve 75 is the ideal signal-to-noise characteristic for a compensator having a tapped delay line with an infinite number of taps. It can be seen that curve 74, having a delay line with 11 taps, has a sufficiently good characteristic in comparison with the ideal characteristic curve 75. For example with separations in pulse lengths of 0.4 the signal-to-noise ratio is only approximately 0.2 db lower than the ideal curve 75. The signal-to-noise ratio with a pulse separation of 0.4 and a delay line of 11 taps is approximately 15.5 db.

The characteristics shown in FIG. 6 are obtained when when the received signal is considered to be a raised-cosine signal 80. The signal-to-noise characteristic at the output of the matched filter is represented here by curve 81. Similarly, the characteristics at the output of the sampled data compensator for a delay of 3, 5 and 11 taps, is represented by curves 82, 83 and 84, respectively. Curve 85 represents the ideal characteristic with a tapped delay line having an infinite number of taps. With a pulse separation of 0.4 and a tapped delay line having 11 taps, the signal-to-noise ratio is approximately 18.8 db. For the same pulse separation the ideal response is also approximately 18.8 db. Hence, it can be from the characteristics of FIGS. 5 and 6 that the shape of the received signal does influence the signal-to-noise ratio.

OPERATION

Before the transmission of information signals to the receiver, it is necessary to set the impulse response of the matched filter and the sampled data compensator. The impulse responses are set by transmitting a single isolated pulse through the channel and measuring the signal at each taps of the matched filter delay line and setting the tap gains accordingly. For the sampled data compensator many sets of impulse response can be stored in the computor and a specific set used when appropriate. The receiver response may be changed automatically by a computer, to maintain an optimum performance as conditions (channel response, noise level, and signalling rate) change. Other methods of setting the impulse response of the sampled data compensator are also possible.

In operation, the received information signal, disturbed by additive noise and intersymbol interference, is applied to the input of the matched filter. The matched filter is constructed from a tapped delay line having sufficient number of taps to produce an impulse response substantially the time inverse of the received signal. The purpose of the matched filter is to minimize the additive noise from the received information signal. The signal output of the matched filter may then be fed to an analog-to-digital converter circuit where the output signal from the matched filter is converted to its digital components. The composite digital signal is then fed to the input of the sampled data compensator.

The sampled data compensator (FIG. 3) is a digital realization of a tapped delay line. A synchronization pulse, in synchronism with the transmitted signal, is applied to a timing and control circuit which connects to the circuits forming the digital tapped delay line and provides a synchronized control of these units. The taps of the delay line are separated by the symbol transmission times such that every information symbol may be analyzed separately. In this case the information symbol is fed to an A–D store and the appropriate tap gain selected. The tap gain and information symbol are then multiplied in a multiplier circuit and passed on to an accumulator where the output information is the desired output signal. This sequence of selection and multiplication is effected in the time interval between the information symbols. A sample of the matched filter output is taken in synchronism with the transmitted symbol sequence, the contents of the A–D store are shifted forward one word, the oldest word being discarded and the newest sample placed into the A–D store in the proper sequence, the accumulator is cleared and the process is repeated. The information signals appearing at the output of the sampled data compensator are substantially free from any noise thereon.

MATHEMATICAL DERIVATIONS

For the case of a receiver consisting of a finite tapped delay line, the impulse response of the receiver is assumed to be $$h(t) = \sum_{n=-M}^{N} a_n S(-t-nT) \quad (1)$$

Define $k(t) = h(-t)$, then $$k(t) = \sum_{n=-M}^{N} a_n S(t-nT) \quad (2)$$

This receiver is shown in FIG. 7. It consists of a matched filter 90 having an impulse response $$h(t) = S(-t)$$

followed by a sampler unit 91 whose output connects to a tapped delay line 92 having a finite number of taps 93.

The signal-to-noise ratio at the output of the receiver is defined by $$\frac{S}{N} = \frac{\left[\int_{-\infty}^{\infty} k(t)S(t)dt\right]^2}{N_0 \int_{-\infty}^{\infty} k^2(t)dt + \sum_{n \neq 0}\left[\int_{-\infty}^{\infty} k(t)S(t-nT)dt\right]^2} \quad (3)$$

To fine the $k(t)$ that maximizes the signal-to-noise ratio $$N_0 \int_{-\infty}^{\infty} k^2(t)dt + \sum_{n \neq 0}\left[\int_{-\infty}^{\infty} k(t)S(t-nT)dt\right]^2 + \lambda\left[\int_{-\infty}^{\infty} k(t)S(t)dt\right]^2 \quad (4)$$

is minimized, subject to the constraint $$\left[\int_{-\infty}^{\infty} k(t)S(t)dt\right]^2 = k^2 = \text{constant} \quad (5)$$

To find the optimum $k(t)$, assume $k(t)$ is optimum and replace $k(t)$ by $k(t)+ag(t)$ where $a$ is a real variable and $g(t)$ is that portion of affected by the $i$th tap, viz $s(t-iT)$. Differentiate Equation 4 with respect to $a$ and set the result equal to zero for $a=0$.

$$\int_{-\infty}^{\infty} S(\tau-iT)\left\{N_0 \sum_{j=-M}^{N} A_j S(\tau-jT)\right.$$
$$+ \left[\sum_{n \neq 0} \int_{-\infty}^{\infty} S(\sigma-nT)\left[\sum_{j=-M}^{N} A_j S(\sigma-jT)\right]d\sigma\right]$$
$$S(\tau-nT) + \lambda\left[\int_{-\infty}^{\infty} S(\sigma)\left[\sum_{j=-M}^{N} A_j S(\sigma-jT)\right]d\sigma\right]S(\tau)\right\}$$
$$d\tau = 0 \quad (6)$$

$$N_0 \sum_{j=-M}^{N} A_j C(j-i) + \sum_{n \neq 0} C(n-i)\left[\sum_{j=-M}^{N} A_j C(n-j)\right]$$
$$+ \lambda C(i)\left[\sum_{j=-M}^{N} A_j C(j)\right] = 0 \quad (7)$$

There will be a similar equation for each $-N \leq i \leq M$ where $$C(i-j) = C(j-i) = \int_{-\infty}^{\infty} S(\tau-iT)S(\tau-jT)d\tau \quad (8)$$

Now $$k = \int_{-\infty}^{\infty} k(\tau)S(\tau)d\tau$$
$$= \int_{-\infty}^{\infty} \sum_{j=-M}^{N} A_j S(\tau-jT)S(\tau)d\tau$$
$$= \sum_{j=-M}^{N} A_j C(j) \quad (9)$$

Equation 7 becomes $$jN_0 \sum_{j=-M}^{N} A_j C(j-i) + \sum_{n} C(n-i)\left[\sum_{=-M}^{N} A_j C(n-j)\right]$$
$$+ k(n-1)C(i) = 0 \quad (10)$$

let
$$k(n-1) = -1 \quad (11)$$

Then $$\sum_{=-M}^{N} A_j\left\{N_0 C(i-j) + \sum_{n} C(i-n)C(n-j)\right\} = C(i) \quad (12)$$

for
$$-M \leq i \leq N$$

Express Equation 12 in matrix notation; let
$$C(i,j) = C(i-j)$$

Then

Equation 12 becomes $$\sum_{j=-M}^{N} A_j\left\{N_0 C(i,j) + \sum_{n} C(i,n)C(n,j)\right\} - C(i,0) = 0 \quad (13)$$

or $$\sum_{j=-M}^{N} A_j\left\{N_0 C(i,j) + D(i,j)\right\} - C(i,0) = 0 \quad (14)$$

where $$D(i,j) = \sum_{\text{all n}} C(i,n)C(n,j) \quad (15)$$

or $$\sum_{j=-M}^{N} a_j E(i,j) - C(i,0) = 0 \quad (16)$$

where $$E(i,j) = D(i,j) + N_0 C(i,j) \quad (17)$$

The general form of the matriv whose elements are $C(i,j)$ is:

$$[C(i,j)] = \begin{pmatrix} C_{-M,-M} & C_{-M,-M+1} & \cdots & C_{-M,0} & \cdots & C_{-M,N} \\ C_{-M+1,-M} & C_{-M+1,-M+1} & \cdots & C_{-M+1,0} & \cdots & C_{-M+1,N} \\ \vdots & & & & & \\ C_{0,-M} & C_{0,-M+1} & \cdots & C_{0,0} & \cdots & C_{0,N} \\ \vdots & & & & & \\ C_{N,-M} & C_{N,-M+1} & \cdots & C_{N,0} & \cdots & C_{N,N} \end{pmatrix}$$

Let $$C(i,j) = C(i-j) = C_{i-j} = C_{j-i}$$

$$[C(i,j)] = \begin{pmatrix} \vdots & & & \\ \cdots C_0 C_1 C_2 \cdots & & C_{M+N} \cdots \\ \cdots C_1 C_0 C_1 C_2 \cdots & & \\ \cdots C_2 C_1 C_0 C_1 \cdots & & C_2 \cdots \\ \vdots & & C_0 C_1 \cdots \\ \cdots C_{M+N} C_{M+N-1} \cdots & & C_2 C_1 C_0 \cdots \\ \vdots & \vdots & \vdots \vdots \vdots \end{pmatrix}$$

The signal-to-noise ratio at the output of the matched filter is given by Equation 3 with $k(t)=s(t)$.

$$\left(\frac{S}{N}\right)_u = \frac{\left[\int_{-\infty}^{\infty} S(t)S(t)dt\right]^2}{N_0 \int_{-\infty}^{\infty} S^2(t)dt + \sum_{n \neq 0}\left[\int_{-\infty}^{\infty} S(t)S(t-nT)dt\right]^2} \quad (18)$$

$$\left(\frac{S}{N}\right)_u = \frac{C^2(0)}{N_0 C^2(0) + \sum_{n \neq 0} C^2(n)} \quad (19)$$

This will be termed the signal-to-noise ratio without equalization.

The signal-to-noise ratio at the output is given by Equation 3 with $k(t)$ given by Equation 2

$$\left(\frac{S}{N}\right) = \frac{\left[\int_{-\infty}^{\infty} \sum_{j=-M}^{N} a_j S(\tau-jT)S(\tau)d\tau\right]^2}{N_0 \int_{-\infty}^{\infty}\left[\sum_{j=-M}^{N} a_j S(\tau-jT)\right]^2 d\tau + \sum_{n \neq 0}\left[\int_{-\infty}^{\infty} \sum_{j=-M}^{N} a_j S(\tau-jT)S(\tau-nT)d\tau\right]^2} \quad (20)$$

$$\left(\frac{S}{N}\right) = \frac{\left[\sum_{j=-M}^{N} a_j C(j)\right]^2}{N_0 \left[\sum_{i=-M}^{N} \sum_{j=-M}^{N} a_i a_j C(i-j)\right] + \sum_{n} \sum_{i,j=-M}^{N} [C(n-j)C(n-i) - C(i)C(j)] a_i a_j} \quad (21)$$

$$= \frac{\left[\sum_{j=-M}^{N} a_j C(j)\right]^2}{\sum_{i,j=-M}^{N} a_i a_j \left\{\left[N_0 C(i-j) + \sum_{n} C(n-j)C(n-i)\right] - C(i)C(j)\right\}} \quad (22)$$

Substituting Equation 13

$$\left(\frac{S}{N}\right) = \frac{\left[\sum_{j=-M}^{N} a_j C(j)\right]^2}{\sum_{i=-M}^{N} a_i C(i) - \sum_{i=-M}^{N} \sum_{j=-M}^{N} a_i a_j C(i) C(j)} \quad (23)$$

$$\left(\frac{S}{N}\right) = \frac{\sum_{j=-M}^{N} a_j C(j)}{1 - \sum_{j=-M}^{N} a_j C(j)} \quad (24)$$

It will be appreciated that in some instances the sampled data compensator 12 of FIGS. 1 and 2 may be used alone or, for example, in conjunction with an un-matched filter in place of filter 10 of FIG. 2. In this case the signal-to-noise ratio formula may be maximized if the sampled data compensator has an impulse response given by a modified form of Equation 1. Equations 2, 3, et cetera may be mathematically derived in a similar manner if the impulse response of the receiver is assumed to be $$h(t) = \sum_{i=-M}^{N} A_i k(t - nT)$$

where:

$k(t)$ is the impulse response of the un-matched filter and
T is the separation between transmitted symbols, i.e., it is the inverse of the signalling rate,
M and N are parameters determining the size of the sampled-data-means;
and MT is the delay required to make $h(t)$ realizable.

The various tap gains $A_i$ are determined by the set of simultaneous linear equations;

$$\sum_{j=-M}^{N} A_i \left\{ N_0 \int_{-\infty}^{\infty} k(t-iT)k(t-jT) dt + \sum_{n=-\infty}^{\infty} y[t-(n+i)T] y[t-(n+j)T] \right\} = y(t-jT)$$

where $$y(t) = \int_{-\infty}^{\infty} S(\tau) k(t-\tau) d\tau$$

is the output signal of the filter due to an input signal s(t), the output information signal of said sampled data means having minimized disturbances thereon and the characteristic of said sampled data means being calculated to maximize the signal-to-noise ratio defined by the formula $$(S/N) = \frac{S^2}{\overline{n^2} + \overline{i^2}}$$

where S=the signal output at that time representing the output information;

$\overline{n^2}$=mean square noise output;

$\overline{i^2}$=the mean square output due to signals representing information at all other times $$[\overline{i^2} = \Sigma i^2]$$

We claim:

1. Apparatus for receiving an input information disturbed by additive noise and intersymbol interference and providing an output information signal with the disturbance substantially minimized including a matched filter adapted to minimize substantially all the additive noise from said input signal, said matched filter having an impulse response which is substantially the time inverse of a particular input signal, an analog-to-digital converter connected to the output of said matched filter, sampled data means electrically connected to the output of said analog-to-digital converter, said sampled data means having an impulse response $f(t)$ defined by $$f(t) = \sum_{i=-M}^{N} A_i \delta(t - (i+M)T)$$

where:

$\delta(t)$ is the unit impulse function and
T is the separation between transmitted symbols, i.e., it is the inverse of the signalling rate;
M and N are parameters determining the size of the sampled-data-means; and
MT is the delay required to make $f(t)$ realizable;
and MT is the delay required to make $f(t)$ realizable;
wherein the various tap gains $A_i$ are determined by the set of simultaneous linear equations;

$$\sum_{j=-M}^{N} A_i \{ N_0 C(i-j) + \sum_{n=-\infty}^{\infty} C(i-n) C(j-n) \} = C(i)$$

where $N_0$ is the power spectral density of the additive noise and $$C(i-j) = \int_{-\infty}^{\infty} S(\tau - iT) S(\tau - jT) d\tau$$

is the autocorrelation of $S(t)$, the signal received when a single, isolated symbol is transmitted; and also, $$C(i) = \int_{-\infty}^{\infty} S(\tau - iT) S(\tau) d\tau$$

the output information signal of said sampled data means having minimized disturbances thereon and the characteristics of said matched filter and sampled data means being calculated to maximize the signal-to-noise ratio defined by the formula $$(S/N) = \frac{S}{\overline{n^2} + \overline{i^2}}$$

where:

S=the signal output at that time representing the output information;

$\overline{n^2}$=mean square noise output;

$\overline{i^2}$=the mean square output due to signals representing information transmitted at all other times $$[\overline{i^2} = \Sigma i^2]$$

2. An information processing system for receiving an input information signal in one form and providing a corresponding output information signal in another form comprising means for feeding said input signal to a matched filter, the output of said matched filter being electrically connected to the input of a sampled data filter provided with a plurality of output taps and a separate amplifier being associated with each tap, said sampled data filter comprising a linear sampled data filter having characteristics such that its impulse response, $f(t)$, is given by $$f(t) = \sum_{i=-M}^{N} A_i \delta[t-(i+M)T]$$

where:

$\delta(t)$ is the unit impulse function and
T is the separation between transmitted symbols, i.e., it is the inverse of the signalling rate;
M and N are parameters determining the size of the sampled-data-means; and
MT is the delay required to make $f(t)$ realizable;

and the respective tap gains are determined by the set of simultaneous linear equations:

$$\sum_{j=-M}^{N} A_j \{ N_0 C(i-j) + \sum_{n=-\infty}^{\infty} C(i+n)C(j-n) \} = C(i)$$

where $N_0$ is the spectral density of the additive noise and $$C(i-j) = \int_{-\infty}^{\infty} S(\tau-iT)S(\tau-jT)d\tau$$

is the autocorrelation of $S(t)$, the signal received when a single, isolated, symbol is transmitted; and where, $$C(i) = \int_{-\infty}^{\infty} S(\tau-iT)S(\tau)d\tau$$

said impulse response being such as to provide a maximum practical signal to noise ratio defined by the formula $$(S/N) = \frac{S^2}{\overline{n^2} + \overline{i^2}}$$

where:

S = the signal output at that time representing the output information;
$\overline{n^2}$ = means square noise output;
$\overline{i^2}$ = the mean square output due to signals representing information signals transmitted at all other times $$[\overline{i^2} = \Sigma i^2]$$

3. Apparatus for receiving an input information signal disturbed by additive noise and intersymbol interference including means for feeding said input information signal to a matched filter having tap gains and being adapted to minimize the additive noise from said input information signal, sampled data means electrically connected to the output of the matched filter and adapted to minimize said intersymbol interference to provide an output information signal corresponding to the input information signal with minimized additive noise and intersymbol interference, said sampled data means having an impulse response $f(t)$ defined by $$f(t) = \sum_{i=-M}^{N} A_i \delta[t-(i+M)T]$$

where:

$\delta(t)$ is the unit impulse function and
T is the separation between transmitted symbols, i.e., it is the inverse of the signalling rate;
M and N are parameters determining the size of the sampled-data means; and
MT is the delay required to make $f(t)$ realizable;

and including means for examining the output information signal and adjusting said tap gains to compensate for variation in the signal to noise ratio.

4. An apparatus for receiving an input information signal in a disturbed form and providing a corresponding output information signal in a substantially minimized disturbed form comprising a matched filter adapted to minimize substantially all the additive noise from said input signal and having an impulse response which is substantially the time inverse of a particular input signal, sampled data means electrically connected to the output of said matched filter and including a plurality of tap connections, a separate amplifier connected to each tap connection, the output of each amplifier being connected to a summing integrator whose output constitutes the output of the sampled data means of said amplifier at least partially determining the impulse response of the sampled data means, said sampled data means having an impulse response given by $$f(t) = \sum_{i=-M}^{N} A_i \delta(t-(i+M)T)$$

where:

$\delta(t)$ is the unit impulse function and
T is the separation between transmitted symbols, i.e., it is the inverse of the signalling rate;
M and N are parameters determining the size of the sampled-data means; and
MT is the delay required to make $f(t)$ realizable; wherein the various tap grains $A_i$ are determined by the set of simultaneous linear equations:

$$\sum_{j=-M}^{N} A_j \left\{ N_0 C(i-j) + \sum_{n=-\infty}^{\infty} C(i-n)C(j-n) \right\} = C(i)$$

where $N_0$ is the power spectral density of the additive noise and $$C(i-j) = \int_{-\infty}^{\infty} S(\tau-iT)S(\tau-jT)d\tau$$

is the autocorrelation of $S(t)$, the signal received when a single, isolated, symbol is transmitted; and also $$C(i) = \int_{-\infty}^{\infty} S(\tau-iT)S(\tau)d\tau$$

5. An apparatus for receiving an input information signal in a disturbed form and providing an output information signal with the disturbance substantially minimized including a match filter adapted to minimize substantially all the additive noise from said input signal and having an impulse response which is substantially the time inverse of a particular input signal, sampled data means electrically connected to the output of said matched filter, said sampled data means having an impulse response $h(t)$ defined by $$h(t) = \sum_{i=-M}^{N} A_i k(t-nT)$$

where:

$k(t)$ is the impulse response of said filter and
T is the separation between transmitted symbols, i.e., it is the inverse of the signalling rate;
M and N are parameters determining the size of the sampled-data means; and
MT is the delay required to make $h(t)$ realizable;

the various tap grains $A_i$ are determined by the set of simultaneous linear equations:

$$\sum_{i=-M}^{N} A_i \left\{ N_0 \int_{-\infty}^{\infty} k(t-iT)k(t-jT)dt + \sum_{n=-\infty}^{\infty} y[t-(n+i)T]y[t-(n+j)T] \right\} = y(t-jT)$$

where $$y(t) = \int_{-\infty}^{\infty} s(\tau)k(t-\tau)d\tau$$

is the output signal of the filter due to an input signal $s(t)$, the output information signal of said sample data means having minimized disturbances thereon and the characteristics of said sample data means being calculated to maximize the signal-to-noise ratio defined by the formula $$(S/N) = \frac{S^2}{\overline{n^2} + \overline{i^2}}$$

where:
S = the signal output at the time representing the output information;
$\overline{n^2}$ = mean square noise output;
$\overline{i^2}$ = the mean square output due to signals representing information transmitted at all other times;

$$[\overline{i^2} = \Sigma i^2]$$

6. A method for receiving an input information signal in a disturbed form and providing an output information signal with the disturbance substantially minimized including the steps of feeding the input information signal to a matched filter adapted to minimize substantially all the additive noise from said input signal and having an impulse response which is substantially the time inverse of a particular input signal, feeding the output of said matched filter to a sampled data means, selecting the impulse response $h(t)$ of said sampled data means in accordance with the formula $$h(t) = \sum_{i=-M}^{N} A_i k(t-nT)$$

where:
k(t) is the pulse response of said filter and
T is the separation between transmitted symbols, i.e., it is the inverse of the signalling rate;
M and N are parameters determining the size of the sampled-data means; and
MT is the delay required to make $h(t)$ realizable;

the various tap gains $A_i$ are determined by the set of simultaneous linear equations:

$$\sum_{i=-M}^{N} A_i \left\{ N_0 \int_{-\infty}^{\infty} k(t-iT)k(t-jT)dt + \sum_{n=-\infty}^{\infty} y[t-(n+i)T]y[t-(n+j)T] \right\} = y(t-jT)$$

where $$y(t) = \int_{-\infty}^{\infty} s(\tau)k(t-\tau)d\tau$$

is the output signal of the filter due to an input signal $s(t)$, the output information signal of said sampled data means having minimized disturbances thereon and the characteristics of said sampled data means being calculated to maximize the signal-to-noise ratio defined by the formula $$(S/N) = \frac{S^2}{\overline{n^2} + \overline{i^2}}$$

where:
S = the signal output at that time representing the output information;
$\overline{n^2}$ = means square noise output;
$\overline{i^2}$ = the mean square output due to signals representing information transmitted at all other times;

$$[\overline{i^2} = \Sigma i^2]$$

References Cited

UNITED STATES PATENTS

| | | | |
|---|---|---|---|
| 2,801,351 | 7/1957 | Calvert et al. | 235—181 X |
| 3,270,188 | 8/1966 | Ares | 235—181 |
| 3,274,541 | 9/1966 | Embree | 340—15.5 |
| 3,303,335 | 2/1967 | Pryor | 340—15.5 |
| 3,307,190 | 2/1967 | Clay et al. | 340—15.5 |
| 3,315,222 | 4/1967 | Bogs | 340—15.5 |
| 3,180,445 | 4/1965 | Schwartz et al. | |
| 3,320,409 | 5/1967 | Larrows | 235—150.5 X |
| 3,400,216 | 9/1968 | Newman | 235—181 X |
| 3,403,247 | 9/1968 | Morgan et al. | 235—181 X |
| 3,221,159 | 11/1965 | Cook et al. | 235—181 |

MALCOLM A. MORRISON, Primary Examiner

R. W. WEIG, Assistant Examiner

U.S. Cl. X.R.

235—181; 340—15.5